US008280867B2

(12) United States Patent
Brown et al.

(10) Patent No.: US 8,280,867 B2
(45) Date of Patent: Oct. 2, 2012

(54) IDENTIFYING DATABASE REQUEST SOURCES

(75) Inventors: Douglas P. Brown, Rancho Santa Fe, CA (US); Bhashyam Ramesh, Secunderabad (IN); Anita Richards, San Juan Capistrano, CA (US)

(73) Assignee: Teradata US, Inc., Dayton, OH (US)

(*) Notice: Subject to any disclaimer, the term of this patent is extended or adjusted under 35 U.S.C. 154(b) by 167 days.

(21) Appl. No.: 11/254,374

(22) Filed: Oct. 20, 2005

(65) Prior Publication Data
US 2007/0100793 A1 May 3, 2007

(51) Int. Cl.
| G06F 17/30 | (2006.01) |
| G06F 15/163 | (2006.01) |
| G06F 9/54 | (2006.01) |
| G06F 13/14 | (2006.01) |

(52) U.S. Cl. .......................... 707/705; 707/899; 719/313
(58) Field of Classification Search .................. 707/100, 707/3, 1, 2, 4, 999.001, 999.002, 999.003, 707/999.004, 608, 703, 705, 899; 719/313
See application file for complete search history.

(56) References Cited

U.S. PATENT DOCUMENTS

| 5,915,095 | A * | 6/1999 | Miskowiec ................. 709/223 |
| 6,085,223 | A * | 7/2000 | Carino et al. ............... 709/203 |
| 6,148,342 | A * | 11/2000 | Ho ............................. 709/225 |
| 6,167,427 | A * | 12/2000 | Rabinovich et al. ........ 709/201 |
| 6,578,159 | B1 * | 6/2003 | Kitagawa et al. ............ 714/15 |
| 6,651,072 | B1 * | 11/2003 | Carino et al. ............ 707/104.1 |
| 6,782,410 | B1 * | 8/2004 | Bhagat et al. .............. 709/201 |
| 6,898,633 | B1 * | 5/2005 | Lyndersay et al. .......... 709/226 |
| 6,917,954 | B2 * | 7/2005 | Ahmad et al. ............... 707/205 |
| 7,100,195 | B1 * | 8/2006 | Underwood .................. 726/2 |
| 7,127,456 | B1 * | 10/2006 | Brown et al. ................ 707/3 |
| 7,127,457 | B1 * | 10/2006 | Ghazal ........................ 707/4 |
| 7,203,691 | B2 * | 4/2007 | Ramesh et al. ............. 707/101 |
| 7,447,796 | B2 * | 11/2008 | Forrester .................... 709/238 |
| 2002/0129294 | A1 * | 9/2002 | Pedone et al. ............... 714/4 |
| 2004/0098359 | A1 * | 5/2004 | Bayliss et al. ............... 707/1 |
| 2005/0132008 | A1 * | 6/2005 | Brown et al. ............... 709/206 |
| 2005/0192937 | A1 * | 9/2005 | Barsness et al. ............ 707/3 |
| 2005/0267878 | A1 * | 12/2005 | Mogi et al. .................. 707/3 |
| 2006/0015512 | A1 * | 1/2006 | Alon et al. ................ 707/100 |
| 2006/0050683 | A1 * | 3/2006 | Wall et al. ................. 370/352 |
| 2006/0064400 | A1 * | 3/2006 | Tsukerman et al. ......... 707/2 |
| 2006/0247944 | A1 * | 11/2006 | Calusinski et al. .......... 705/1 |
| 2007/0011260 | A1 * | 1/2007 | Chiu ........................... 709/207 |

OTHER PUBLICATIONS

Beauchemin, B., Essential ADO .NET, 2002, Addison Wesley Professional, Chapter 1, Section 5.*

* cited by examiner

Primary Examiner — Jorge A Casanova
(74) Attorney, Agent, or Firm — Howard Speight

(57) ABSTRACT

A method, computer program, and database system are disclosed for identifying a second source of a request sent to a database management system by a first source. A database message is received from the first source. The database message includes a second value for a second source-identifying parameter. The second value identifies a second source. The second value for the second source-identifying parameter is stored in a log.

3 Claims, 42 Drawing Sheets

ADMINISTRATOR

REGULATOR

WORKLOAD QUERY
(DELAY) MANAGER

EXCEPTION MONITOR

| Workload Group Name | Classify & Exception Criteria | S.L. Goals Desired Response & Service Level | S.L.Goal Enforcement Priority | Operating Window | Arrival Rate | Initiation Instruction | Exception Processing |
|---|---|---|---|---|---|---|---|
| Inventory Tactical | criteria | <= 1 sec @ 95% | Tactical | 8AM-6PM | 75/sec | Expedite | Inventory Long Qr |
| CRM Tactical | criteria | <= 3 sec @ 80% | Tactical | 6AM-6PM | 25/sec | Expedite | CRM Analytics |
| Call Ctr Tactical | criteria | <= 2 sec @ 90% | Tactical | 7AM-12PM | 200/sec | Expedite | Call Ctr Reports |
| Sales Short Qry | criteria | < 10 sec @ 90% | Priority | 7AM-12PM | 500/hour | Exec | Log |
| CRM Short Qry | criteria | < 2 min @ 75% | Normal | 9AM-3PM | 35/hour | Delay | Log |
| SuperUser/ShortDBA | criteria | < 5 min @ 50% | Normal | 8AM-10AM | 15/hour | Exec | none |
| Inventory Long Qry | criteria | < 30 min @ 80% | Normal | all | 3/hour | Exec | Alert |
| Call Ctr Reports | criteria | < 20 min @ 80% | Normal | all | 0.2/hour | Exec | none |
| Sales Cont Loads | criteria | per arrival rate | Tactical | 7AM-11AM | 5000/sec | Expedite | none |
| Inventory Batch | criteria | none | Backgrnd | 10PM-9AM | unknown | Delay | Abort |
| CRM Analytics | criteria | none | Backgrnd | 10PM-10AM | unknown | Exec | Alert |
| Sales Long Qry | criteria | < 8 hours @ 50% | Backgrnd | all | unknown | Exec | Abort |
| Development | criteria | none | Backgrnd | 8AM-8PM | unknown | Exec | |

Workloads for 8AM-10AM Reg.Weekdays

FIG. 9

| Workload Definition Name | S.L. Goals Desired Response & Service Level | Enforcement Priority | Operating Window | Arrival Rate | Initiation Instruction | Exception Processing |
|---|---|---|---|---|---|---|
| Inv-Tactical | <= 1 sec @ 95% | 2 | 8AM-6PM | 75/sec | Expedite | Inv Long Qry |
| | | 3 | 6PM-12AM | 20/sec | Expedite | Inv Long Qry |
| | | 6 | 12AM-8AM | 100/hour | Exec | Abort |

Operating Windows for Workload: Inventory Tactical

FIG. 10

Exception Conditions for Inventory Tactical ▼

If   CPU time > 500ms and ((Disk To CPU Ratio < 50) or (CPU Skew > 40%))

for at least 120 seconds

Exception Workload Group: Inventory Long Qry

\* If exception condition contains Blocked Time or Response Time criteria, no exception workload group is valid. The other exception processing options may still be used. (See exception processing options.)

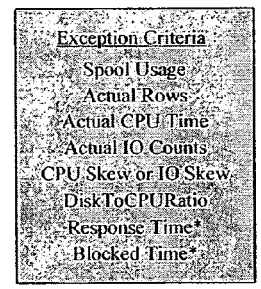

Exception Criteria
Spool Usage
Actual Rows
Actual CPU Time
Actual IO Counts
CPU Skew or IO Skew
DiskToCPURatio
Response Time*
Blocked Time*

FIG. 12

Execution Initiation Instructions for Inventory Tactical 8AM-6PM ▼

○ Execute (normal)
● Expedite Execution
○ Delay Until Delay Conditions

FIG. 13

Exception Processing for Inventory Tactical 8AM-6PM ▼

○ Abort Request
○ Continue / log condition (Warning Mode)
● Continue / Change Workload Group to Inventory Long Qry ▼
○ Continue / Send Alert to DBA ▼

*FIG. 14*

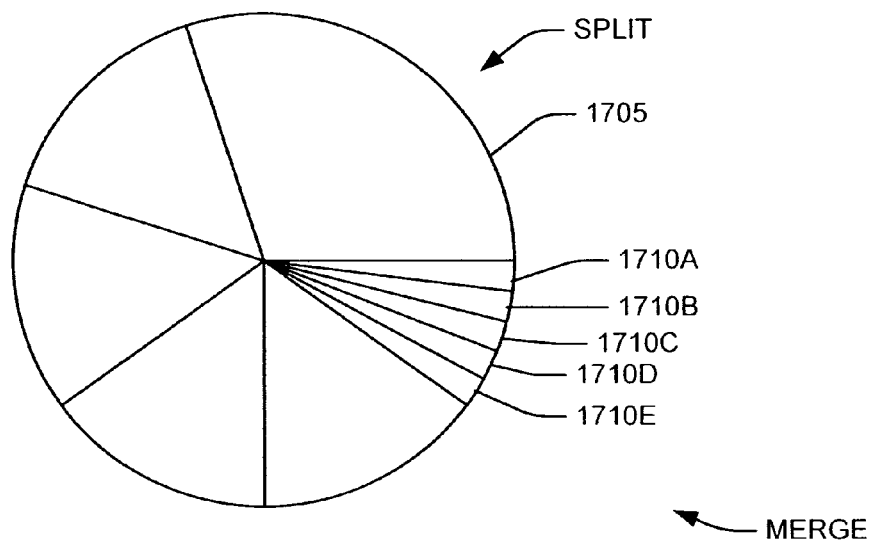
FIG. 17
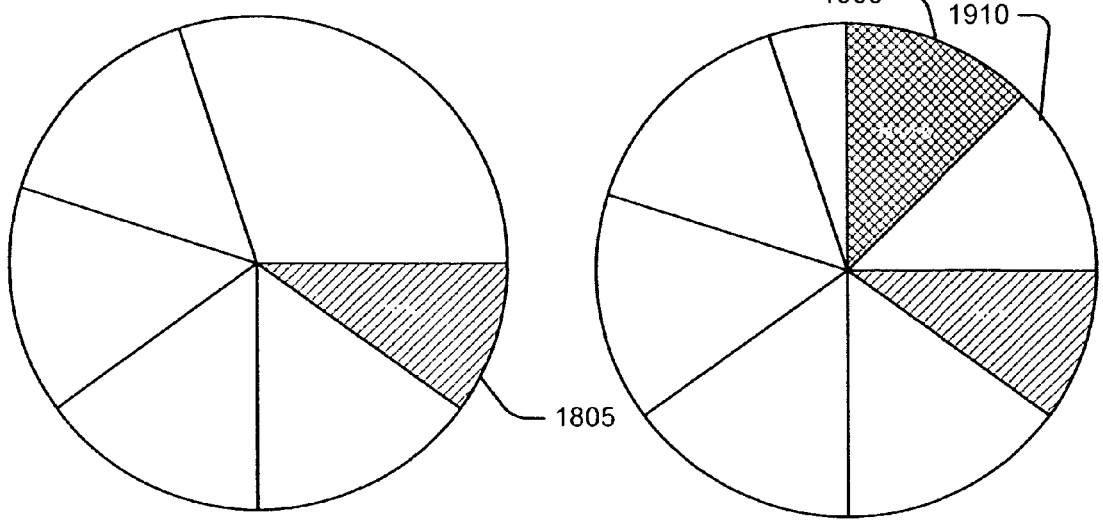
FIG. 18
AFTER MERGE
FIG. 19
AFTER SPLIT (WORKLOAD RULES)

| Category | Rules |
|---|---|
| 1 | Object-based Filtering |
| 2 | Object-based Throttling |
| 3 | Workload Definition |
|   | Workload Classification Attributes |
|   | Workload Throttling Attributes |
|   | Workload Exception Attributes |

*FIG. 25*

| When | Date and time |
|---|---|
| Who | User Id |
|   | Account ID |
|   | Application ID |
|   | Query Band |
|   | Client ID (from Logon Source) |
|   | Client Address |
|   | Profile |
| What | Estimated processing time |
|   | Estimated answer set |
|   | Type of statement (Select, DML, DDL or All.) |
|   | Join, full table scan conditions |
| Where | Database, table, view etc |

*FIG. 26*

| |
|---|
| Category 1 & 2 |
|     Rule A |
|     Rule B |
| Workload Administration |
|     Periods |
|         Period 1 |
|         Period 2 |
|     Workload Definitions |
|         WD-U |
|         WD-V |
|         WD-W |
| Priority Scheduler |
|     WD to Allocation Group Mapping |

| RPID | RP 0 | RP 1 | RP 2 | RP 3 | RP 4 |
|---|---|---|---|---|---|
| Name | Default | | | | |
| Assigned Weight | 100 | | | | |
| Relative Weight | | | | | |

| AG Name | Weight | Reserved AWT's | Enforcement Priority |
|---|---|---|---|
| Tactical | 100 | 20 | |
| | | | |

| Period Name | Date/Time | Allocation Group | Resource Partition |

Periods

[ddd ▼]

| AG Name | Weight | Reserved AWT's | CPU Limit | Enforcemen |
|---|---|---|---|---|
| L | 5 | 0 | 100 | 4 |
| BaseL | 5 | 0 | 100 | 4 |
| M | 10 | 0 | 100 | 3 |
| BaseM | 10 | 0 | 100 | 3 |
| BaseH | 20 | 0 | 100 | 2 |
| H | 20 | 0 | 100 | 2 |
| BaseR | 40 | 0 | 100 | 1 |
| R | 40 | 4 | 100 | 1 |

Allocation Group Description

[Accept]  [Restore]

```
                    ┌─────────────────┐
                    │ FOR EACH WORKLOAD│              ← 4505
                    │ DEFINITION,      │
                    │ IDENTIFY ONE     │
                    │ OR MORE BUSINESS │── 4605
                    │ CONCEPTS         │
                    │ ASSOCIATED WITH  │
                    │ REQUESTS THAT    │
                    │ WILL IDENTIFY    │
                    │ REQUESTS TO BE   │
                    │ CLASSIFIED TO    │
                    │ THAT WORKLOAD    │
                    └─────────────────┘
```

FIG. 46

```
                    ┌─────────────────┐
                    │ FOR EACH WORKLOAD│              ← 4510
                    │ DEFINITION,      │
                    │ IDENTIFY ONE OR  │
                    │ MORE ATTRIBUTES  │
                    │ OF REQUESTS      │── 4705
                    │ CLASSIFIED TO    │
                    │ THAT WORKLOAD    │
                    │ THAT DETERMINE   │
                    │ IF SUCH REQUESTS │
                    │ ARE REJECTED,    │
                    │ THROTTLED, OR RUN│
                    │ WITH SPECIAL     │
                    │ PRIVILEGES       │
                    └─────────────────┘
```

FIG. 47

REGULATOR

IDENTIFYING DATABASE REQUEST SOURCES

CROSS REFERENCE TO RELATED APPLICATIONS

This application is related to U.S. patent application Ser. No. 10/730,348, filed Dec. 8, 2003, entitled Administering the Workload of a Database System Using Feedback, by Douglas P. Brown, Anita Richards, Bhashyam Ramesh, Caroline M. Ballinger and Richard D. Glick; this application is related to U.S. patent application Ser. No. 10/786,448, filed Feb. 25, 2004, entitled Guiding the Development of Workload Group Definition Classifications, by Douglas P. Brown, Bhashyam Ramesh and Anita Richards; this application is related to U.S. patent application Ser. No. 10/889,796, filed Jul. 13, 2004, entitled Administering Workload Groups, by Douglas P. Brown, Anita Richards, and Bhashyam Ramesh; this application is related to U.S. patent application Ser. No. 10/915,609, filed Jul. 13, 2004, entitled Regulating the Workload of a Database System, by Douglas P. Brown, Bhashyam Ramesh, and Anita Richards.

BACKGROUND

It is often important to identify the source of a request, such as a query, sent to a database management system (DBMS). Such information has many uses. For example, source information enables accounting to determine the share of a DBMS's resources that are consumed by a particular source. That information may be used for a number of purposes: (1) to charge back to the source a portion of the DBMS costs; (2) to identify, in a long-term-historical sense, the amount of work and the number of requests that come from each source so that performance tuning can be better focused to the largest, or otherwise most important, consumers as well as providing valuable insight into capacity planning as different workloads grow at different rates and, as a consequence, have different impacts on system sizing; (3) to identify, in real-time or recent historical terms, the precise source of a request so that if the request is determined to be problematic, it can be resolved or at least better understood by the database administrator (i.e., to abort or not to abort, or, if the request has already been completed, to relate resource usage metrics, SQL text, etc. of a particular query to its original source)

SUMMARY

In general, in one aspect, the invention features a method for identifying a second source of a request sent to a database management system by a first source. The method includes receiving a database message from the first source. The database message includes a second value for a second source-identifying parameter. The second value identifies a second source. The method further includes storing the second value for the second source-identifying parameter in a log.

Implementations of the invention may include one or more of the following. The database message may include a first value for a first source-identifying parameter. The first value may identify the first source. The first value for the first source-identifying parameter may be stored in the log. The second source may be above the first source in a multi-tier architecture for sending requests to the database management system. The second source may submit requests through the first source to the database management system in a session pooling environment. The database message may include a second timestamp information related to the time that the second source performed processing related to the message. The method may include initiating a session associated with the second source when the database message is a session-initiating database message. The method may include receiving a subsequent database message from the first source including the second value for the second source-identifying parameter. The method may include storing the second value for the second source-identifying parameter from the subsequent database message in the log in such a way that the second value from the subsequent database message is associated with the session. The method may include using the second value stored in the log to manage the allocation of the database system resources.

In general, in another aspect, the invention features a computer program, stored on a tangible storage medium, for use in identifying a second source of a request sent to a database management system by a first source. The computer program includes executable instructions that cause a computer to receive a database message from the first source. The database message includes a second value for a second source-identifying parameter. The second value identifies a second source. The computer program further includes executable instructions that cause the computer to store the second value for the second source-identifying parameter in a log.

In general, in another aspect, the invention features a database system including a massively parallel processing system. The massively parallel processing system includes one or more nodes; a plurality of CPUs, each of the one or more nodes providing access to one or more CPUs; a plurality of data storage facilities each of the one or more CPUs providing access to one or more data storage facilities; and a process, running on one or more of the plurality of CPUs, for identifying a second source of a request sent to a database management system by a first source. The process includes receiving a database message from the first source. The database message includes a second value for a second source-identifying parameter. The second value identifies a second source. The process further includes storing the second value for the second source-identifying parameter in a log.

BRIEF DESCRIPTION OF THE DRAWINGS

FIGS. 9-14 are screen shots illustrating the selection of service level agreement parameters.
FIGS. 17-19 illustrate merging and splitting workload groups.
FIGS. 20-23 are flowcharts illustrating a guide for the creation of workload rules.
FIG. 25 illustrates categories of workload rules.
FIG. 26 illustrates types of filtering attributes.
FIG. 27 illustrates a tree.
FIGS. 28-38 show administrator screen shots.
FIGS. 39-50 are administrator flow charts.

DETAILED DESCRIPTION

Figure 1:
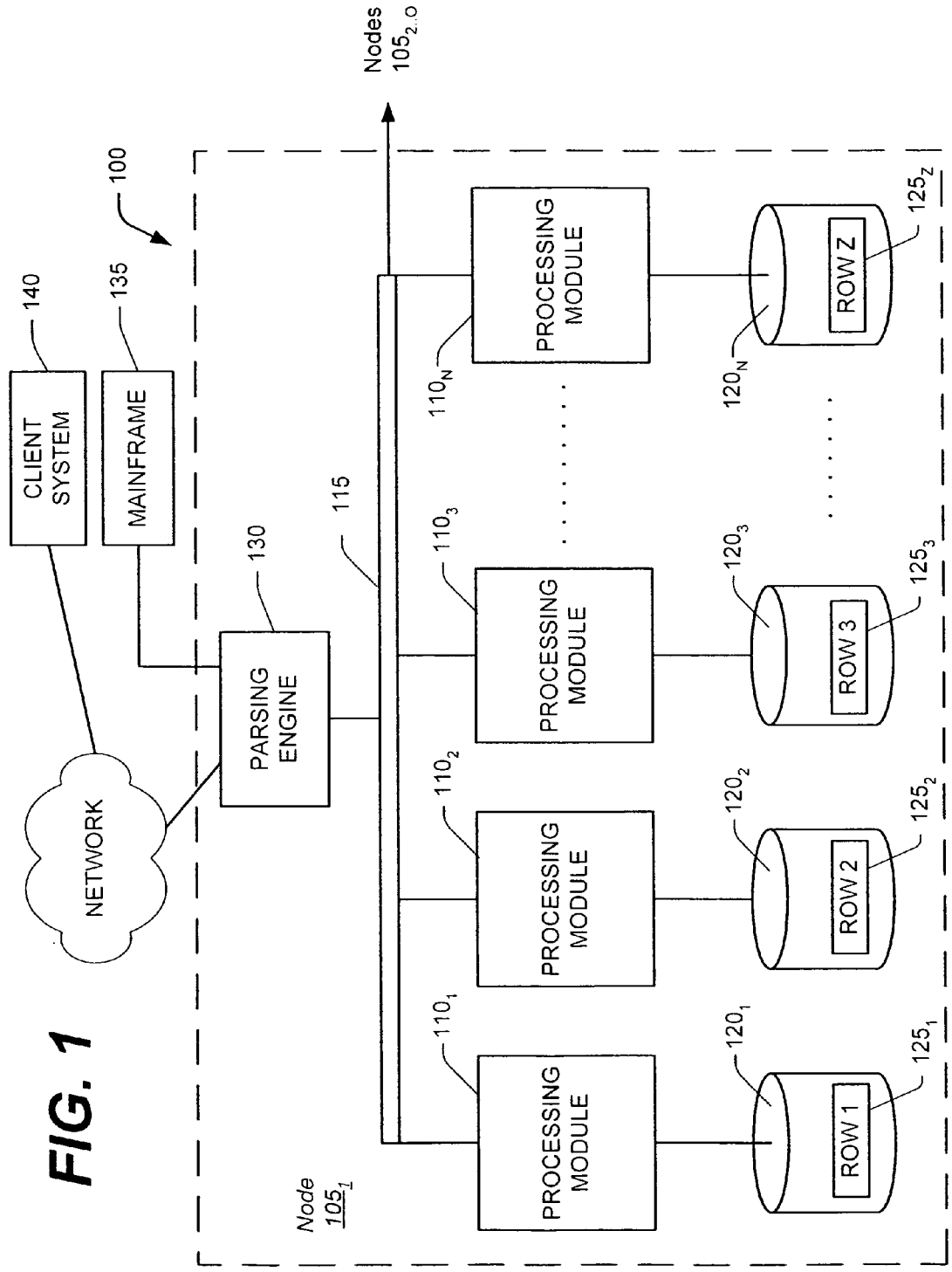
FIG. 1 is a block diagram of a node of a database system.

The technique for guiding the development of workload group definition classifications disclosed herein has particular application, but is not limited, to large databases that might contain many millions or billions of records managed by a database system ("DBMS") 100, such as a Teradata Active Data Warehousing System available from NCR Corporation. FIG. 1 shows a sample architecture for one node $105_1$ of the DBMS 100. The DBMS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBMS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBMS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
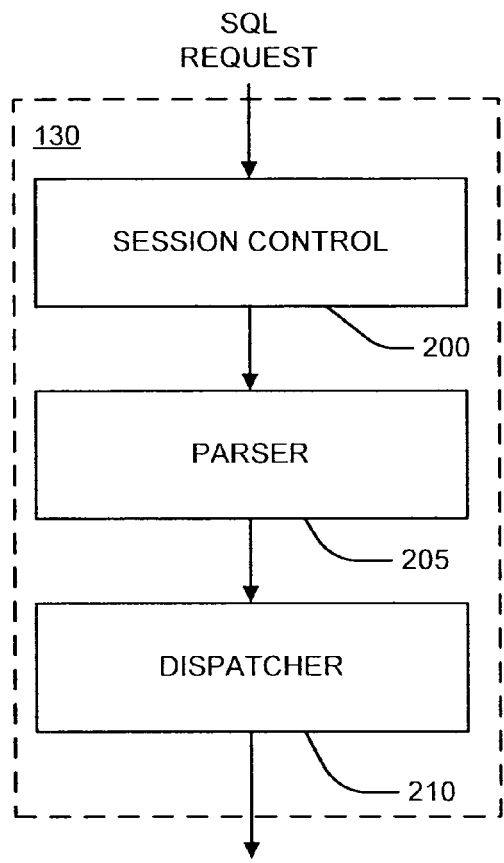
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
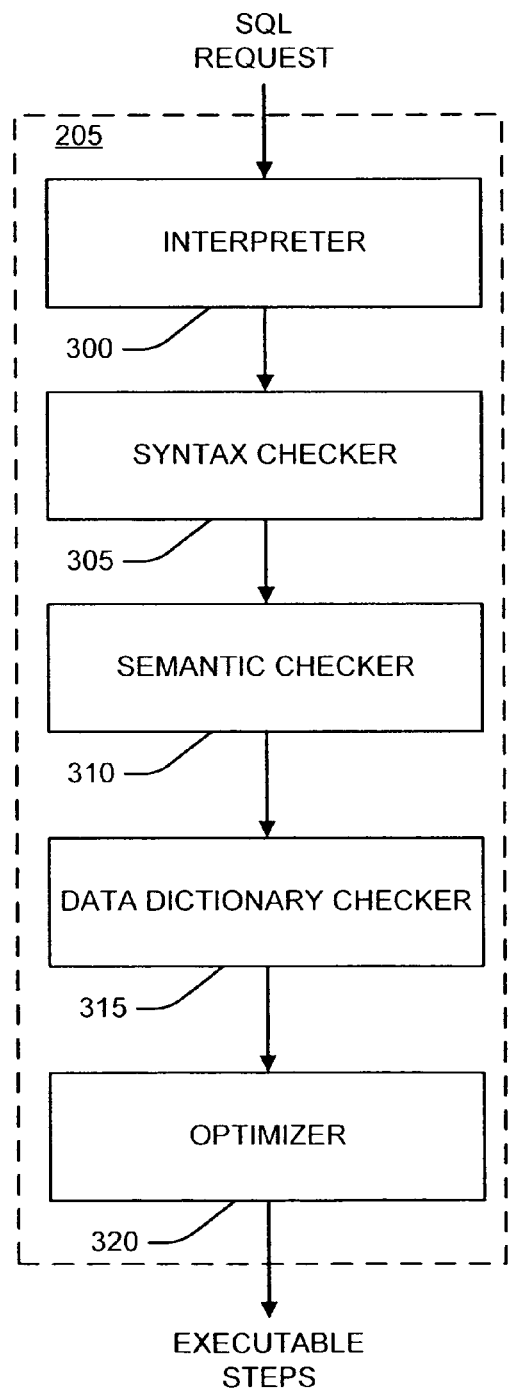
FIG. 3 is a block diagram of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which generates the least expensive plan to perform the request.

The new set of requirements arising from diverse workloads requires a different mechanism for managing the workload on a system. Specifically, it is desired to dynamically adjust resources (e.g. CPU, disk I/O, BYNET (which is NCR's term for the network 115), memory, sessions, etc.) in order to achieve a set of per-workload response time goals for complex "multi-class" workloads. In this context, a "workload" is a set of requests, which may include queries or utilities, such as loads, that have some common characteristics, such as application, source of request, type of query, priority, response time goals, etc., and a "multi-class workload" is an environment with more than one workload. Automatically managing and adjusting database management system (DBMS) resources (tasks, queues, CPU, memory, memory cache, disk, network, etc.) in order to achieve a set of per-workload response time goals for a complex multi-class workload is challenging because of the inter-dependence between workloads that results from their competition for shared resources.

The DBMS described herein accepts performance goals for each workload as inputs, and dynamically adjusts its own performance knobs, such as by allocating DBMS resources and throttling back incoming work, using the goals as a guide. In one example system, the performance knobs are called priority scheduler knobs. When the priority scheduler knobs are adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBMS may find a performance knob setting that achieves one workload's goal but makes it difficult to achieve another workload's goal.

The performance goals for each workload will vary widely as well, and may or may not be related to their resource demands. For example, two workloads that execute the same application and DBMS code could have differing performance goals simply because they were submitted from different departments in an organization. Conversely, even though two workloads have similar performance objectives, they may have very different resource demands.

One solution to the problem of automatically satisfying all workload performance goals is to use more than one mechanism to manage system workload. This is because each class can have different resource consumption patterns, which means the most effective knob for controlling performance may be different for each workload. Manually managing the knobs for each workload becomes increasingly impractical as the workloads become more complex. Even if the DBMS can determine which knobs to adjust, it must still decide in which dimension and how far each one should be turned. In other words, the DBMS must translate a performance goal specification into a particular resource allocation that will achieve that goal.

The DBMS described herein achieves response times that are within a percentage of the goals for mixed workloads consisting of short transactions (tactical), long-running complex join queries, batch loads, etc. The system manages each component of its workload by goal performance objectives.

While the system attempts to achieve a "simultaneous solution" for all workloads, it attempts to find a solution for every workload independently while avoiding solutions for one workload that prohibits solutions for other workloads. Such an approach significantly simplifies the problem, finds solutions relatively quickly, and discovers a reasonable simultaneous solution in a large number of cases. In addition, the system uses a set of heuristics to control a 'closed-loop' feedback mechanism. In one example system, the heuristics are "tweakable" values integrated throughout each component of the architecture and the weights assigned to each of the resource partitions and allocation groups for a particular performance knob setting. Further, the system provides insight into workload response times in order to provide a much finer granularity of control over response times.

In most cases, a system-wide performance objective will not, in general, satisfy a set of workload-specific goals by simply managing a set of system resources on an individual query(ies) basis (i.e., sessions, requests). To automatically achieve a per-workload performance goal in a database or operating system environment, the system first establishes system-wide performance objectives and then manages (or regulates) the entire platform by managing queries (or other processes) in workloads.

The system includes a "closed-loop" workload management architecture capable of satisfying a set of workload-specific goals. In other words, the system is an automated goal-oriented workload management system capable of supporting complex workloads and capable of self-adjusting to various types of workloads. The system's operation has five major phases: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; 4) recommending adjustments to workload definitions (e.g. by splitting or merging workload definitions) in order to better isolate the subset of the workload that requires different workload management than the remainder of the original workload, and 5) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer adaptive feedback, and 4) through recommending adjustments to SLGs of one workload to better complement the SLGs of another workload that it might be impacting. All recommendations can either be enacted automatically, or after "consultation" with the database administrator ("DBA"). The system includes the following components (illustrated in FIG. 4):

1) Administrator (block 405): This component provides a GUI to define workloads and their SLGs and other workload management requirements. The administrator 405 accesses data in logs 407 associated with the system, including a query log, and receives capacity planning and performance tuning inputs as discussed above. The administrator 405 is a primary interface for the DBA. The administrator also establishes workload rules 409, which are accessed and used by other elements of the system.

2) Monitor (block 410): This component provides a top level dashboard view and the ability to drill down to various details of workload group performance such as aggregate execution time, execution time by request, aggregate resource consumption, resource consumption by request, etc. Such data is stored in the query log and other logs 407 available to the monitor. The monitor also includes processes that initiate the performance improvement mechanisms listed above and processes that provide long term trend reporting, which may include providing performance improvement recommendations. Some of the monitor functionality may be performed by the regulator, which is described in the next paragraph. The Regulator monitors workloads internally. It does this by using internal messages sent from the AMPs to the dispatcher 210. The dispatcher 210 provides an internal status of every session and request running on the system.

3) Regulator (block 415): This component dynamically adjusts system settings and/or projects performance issues and either alerts the database administrator (DBA) or user to take action, for example, by communication through the monitor, which is capable of providing alerts, or through the exception log, providing a way for applications and their users to become aware of, and take action on, regulator actions. Alternatively, the regulator can automatically take action by deferring requests or executing requests with the appropriate priority to yield the best solution given requirements defined by the administrator (block 405).

Administration of Workload Groups (Workload Management Administrator)

The workload management administrator (block 405), or "administrator," is responsible for determining (i.e., recommending) the appropriate application settings based on SLGs. Such activities as setting weights, managing active work tasks and changes to any and all options will be automatic and taken out of the hands of the DBA. The user will be masked from all complexity involved in setting up the priority scheduler, and be freed to address the business issues around it.

Figure 5:
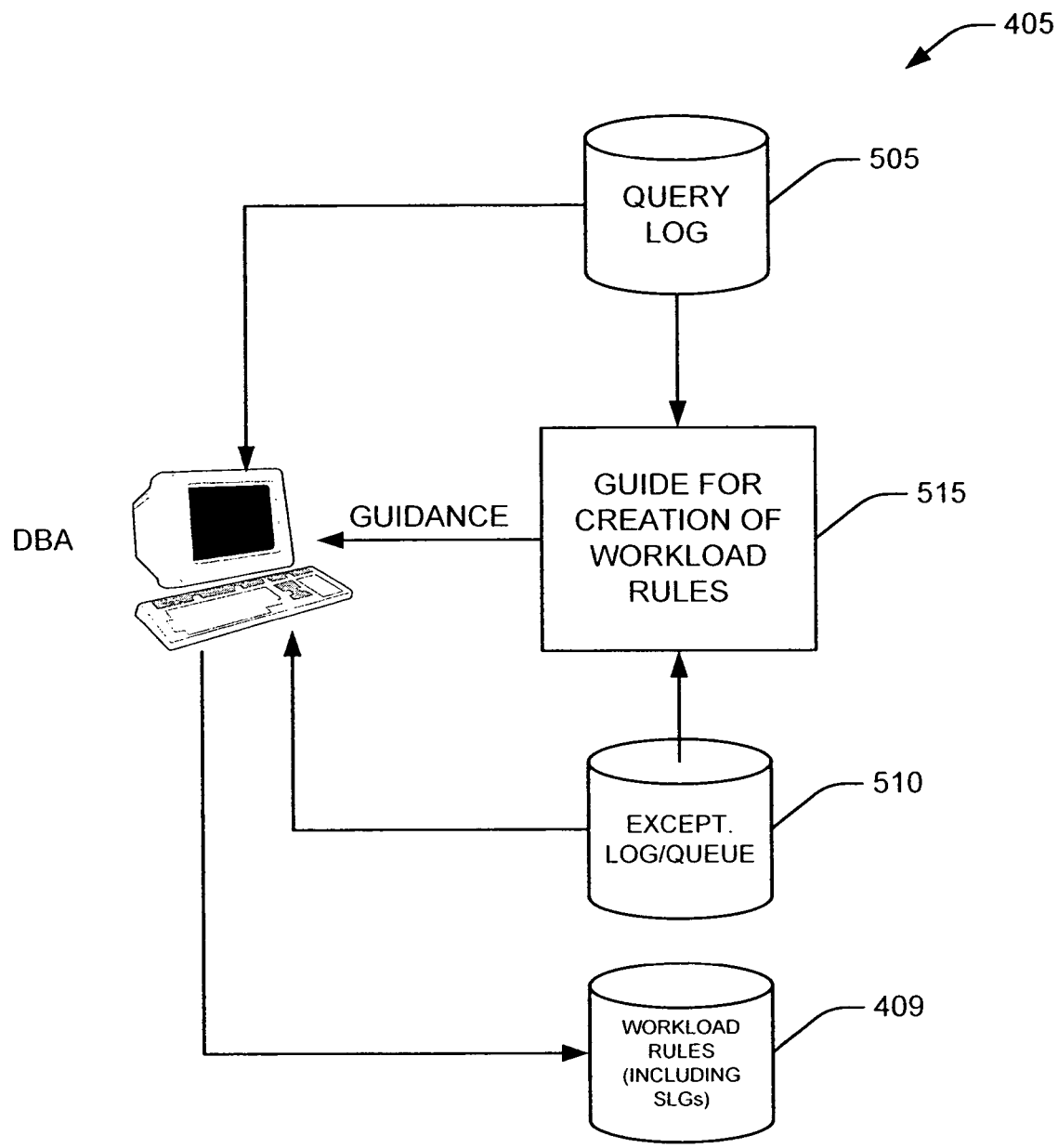

As shown in FIG. 5, the workload management administrator (block 405) allows the DBA to establish workload rules, including SLGs, which are stored in a storage facility 409, accessible to the other components of the system. The DBA has access to a query log 505, which stores the steps (i.e. requests) performed by the DBMS in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in:
a) Establishing rules for dividing requests into candidate workload groups, and creating workload group definitions. Requests with similar characteristics (users, application, table, resource requirement, etc.) are assigned to the same workload group. The system supports the possibility of having more than one workload group with similar system response requirements.
b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log (from data stored by the regulator, as described below), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings, as described below. These SLG requirements are distributed to the rest of the system as workload rules.
c) Optionally, establishing priority classes and assigning workload groups to the classes.

Workload groups with similar performance requirements are assigned to the same class.

d) Providing proactive feedback (i.e.: Validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

Figure 16:
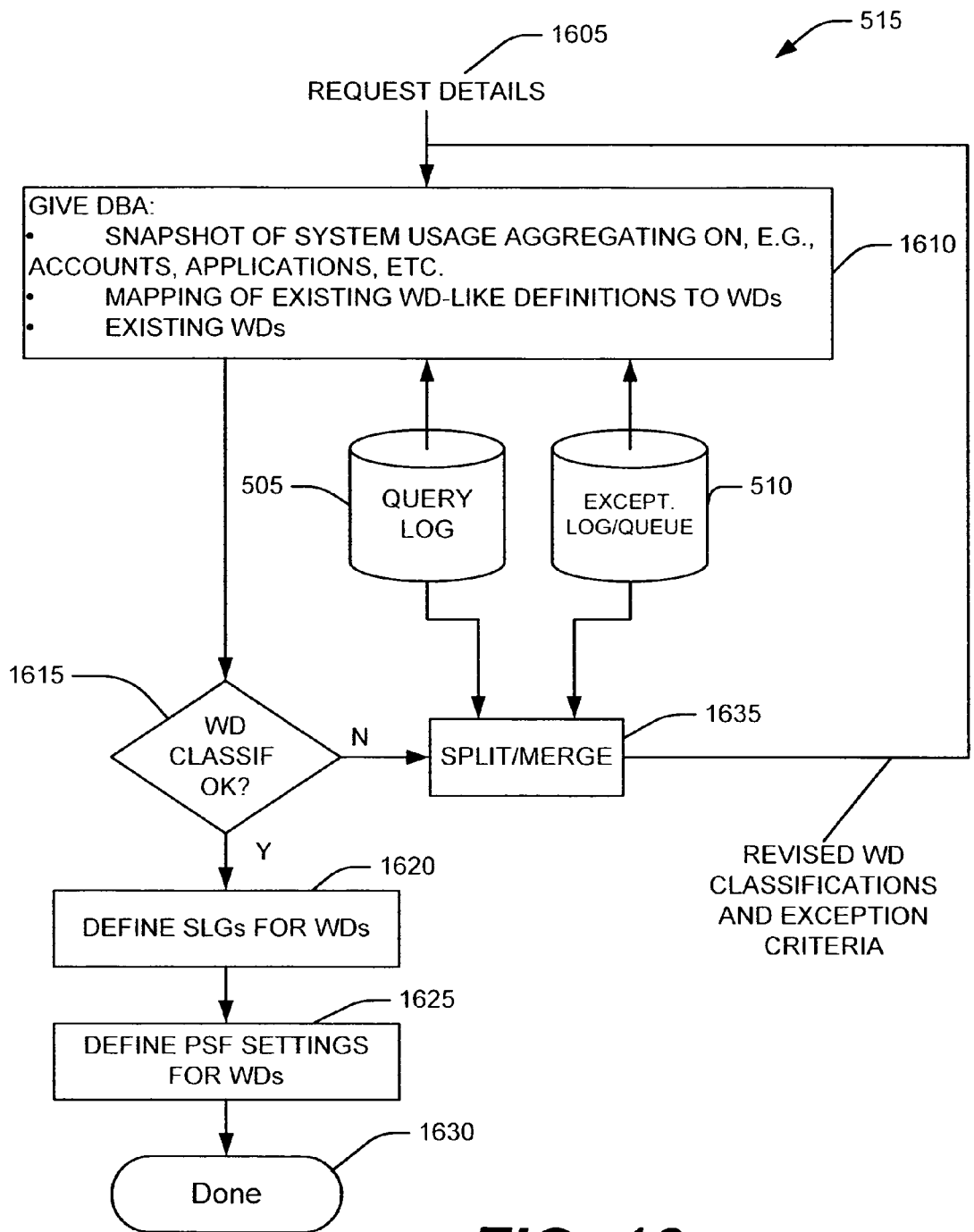

The guide for creation of workload rules 515, shown in more detail in FIG. 16, is initiated by a request for WD classification details, typically from the DBA. In response, the system provides one or more of the following sets of information, much of which is retrieved from the query log 505 or the exception log 510 (block 1610):
a. A snapshot of system usage, aggregating the reported information on, for example, accounts, applications, etc. Such information typically is not grouped by WD or by WD classification but can be used as the raw data to identify WD classifications or to create WD classifications where they do not yet exist or where additional WD classifications are necessary. For example, if the snapshot is sorted by account, it may become apparent to the DBA that some requests from a particular account should be classified the same way. Similarly, aggregating the reported information on applications may help identify requests associated with a particular application that should be assigned to the same WD classification. An example of such an application might be point-of-sale applications that should be assigned to a tactical WD classification giving them priority and quick response times.
b. A mapping of existing WD-like definitions to WD classifications. The system would provide this type of information when WD classifications have not yet been defined or where WDs have not yet been classified. The system would map existing WD-like information and classification information to existing or suggested WD classifications. The DBA can accept the mapping, which would have the effect of creating the WD classifications, or can adjust the assignments as necessary.
c. Existing WD classification information. The system provides existing WD classification information where it has already been defined. The DBA can decide to accept the existing WD classification information or to modify it.

The DBA determines whether the provided WD classification information is satisfactory (block 1615). If it is, the system initiates the definition of SLGs for the WDs (block 1620, described in more detail with respect to FIG. 22) and defines PSF settings, i.e. parameters that define the way system resources are dynamically assigned to requests, for WDs (block 1625, defined in more detail with respect to FIG. 23). The process of guiding the creation of workload rules (block 515) is then complete (block 1630).

If, on the other hand, the DBA determines that the provided WD classification information is not satisfactory (block 1615), the system splits and merges the WD classifications (block 1635). The basic approach to splitting and merging WD classifications is illustrated in FIGS. 17-19. FIG. 17 shows system usage information over a period of time sorted by WD classification, each WD classification corresponding to a section or "slice" of the pie. As can be seen, one WD classification 1705 is consuming a large share of the system resources while five other WD classifications 1710A, 1710B, 1710C, 1710D and 1710E are consuming a much smaller share than the other WD classifications in the system. The system may decide to split WD classification 1705 and to merge WD classifications 1710A, 1710B, 1710C, 1710D and 1710E. After the merge, as shown in FIG. 18, WD classifications 1710A, 1710B, 1710C, 1710D and 1710E have been merged into a single WD classification 1805. After the split, as shown in FIG. 19, WD classification 1705 has been split into WD classifications 1905 and 1910.

Figure 20:
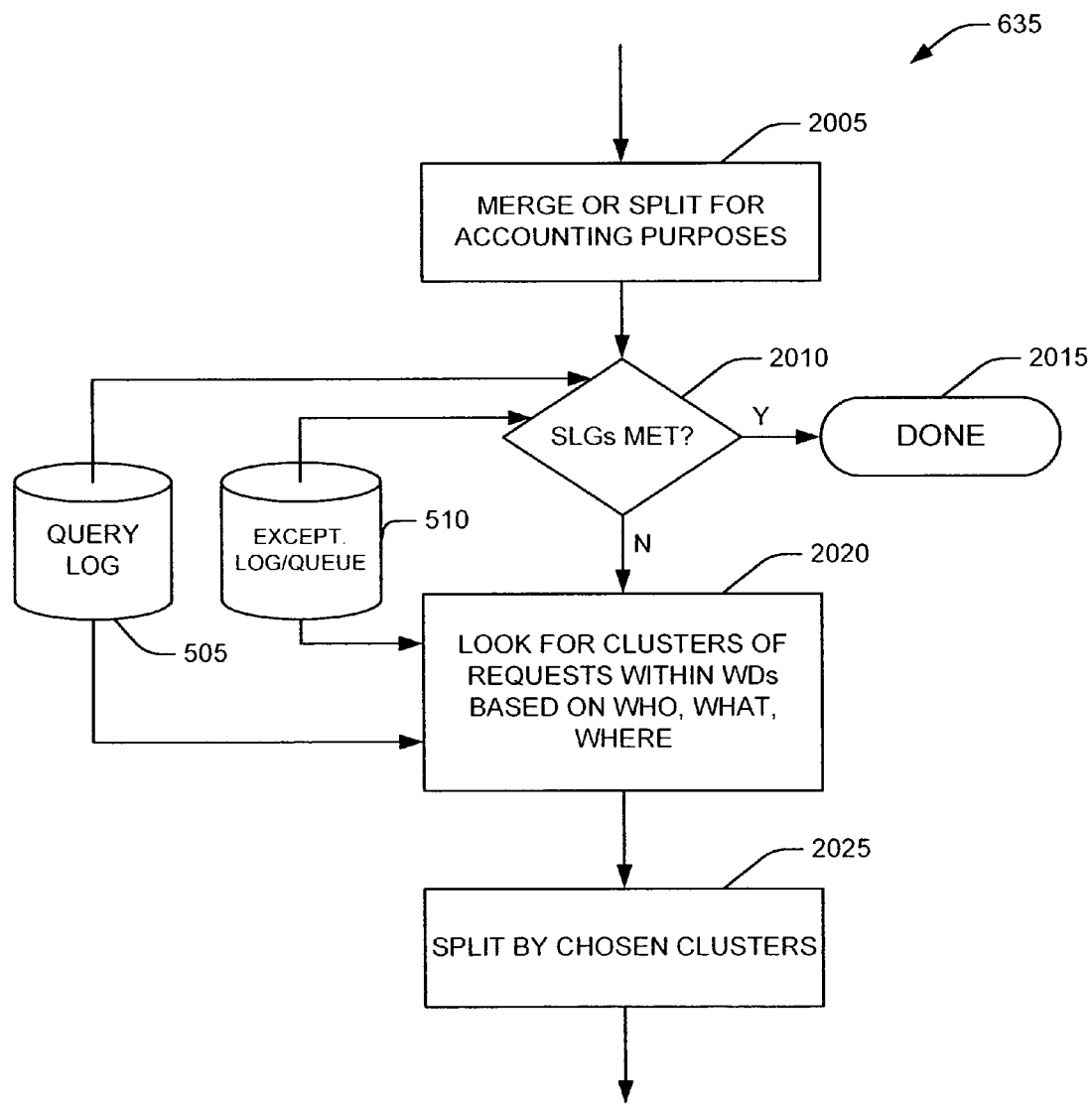

The process for merging or splitting existing WD classifications, illustrated in FIG. 20, begins by merging or splitting the WD classifications for accounting purposes (block 2005). This process accommodates the DBA's possible interest in dividing or merging the WD classifications by account. For example, the DBA may want to assign a particular account to its own WD classification to identify its resource consumption and performance characteristics. Similarly, the DBA may decide to combine WD classifications that are similar and do not require such granular identification.

Once the WD classifications are merged or split for accounting reasons (block 2005), the system determines if the SLGs for the WD classifications have been met (block 2010). It does this by aggregating information from the query log 505 and the exception log 510 regarding the performance of the requests that ran under each WD classification and comparing the aggregated performance against the SLGs. Alternatively, the performance of each request under a WD classification could be compared to the SLGs and the statistics regarding the number of requests that satisfy the SLGs could be compiled and compared against a threshold.

If the SLGs are met, the process is complete (block 2015). If the SLGs are not met and the workload is heterogeneous suggesting that the SLGs of a subset of requests are met while others are not met, the system considers splitting the workload into two or more workloads to enable different workload management controls such that all SLGs can be met. It can do this by using information from the query log 505 and the exception log 510 to look for clusters of requests within the WD classifications based on who, what, and where request information, such as the source of request ("who"), the application ("what"), the type of query ("what"), the priority ("what"), the database object such as table, view or database ("where"), etc. (block 1020, described in more detail with respect to FIG. 21). The system then splits the WD classifications based on the chosen clusters (block 2025).

Figure 21:
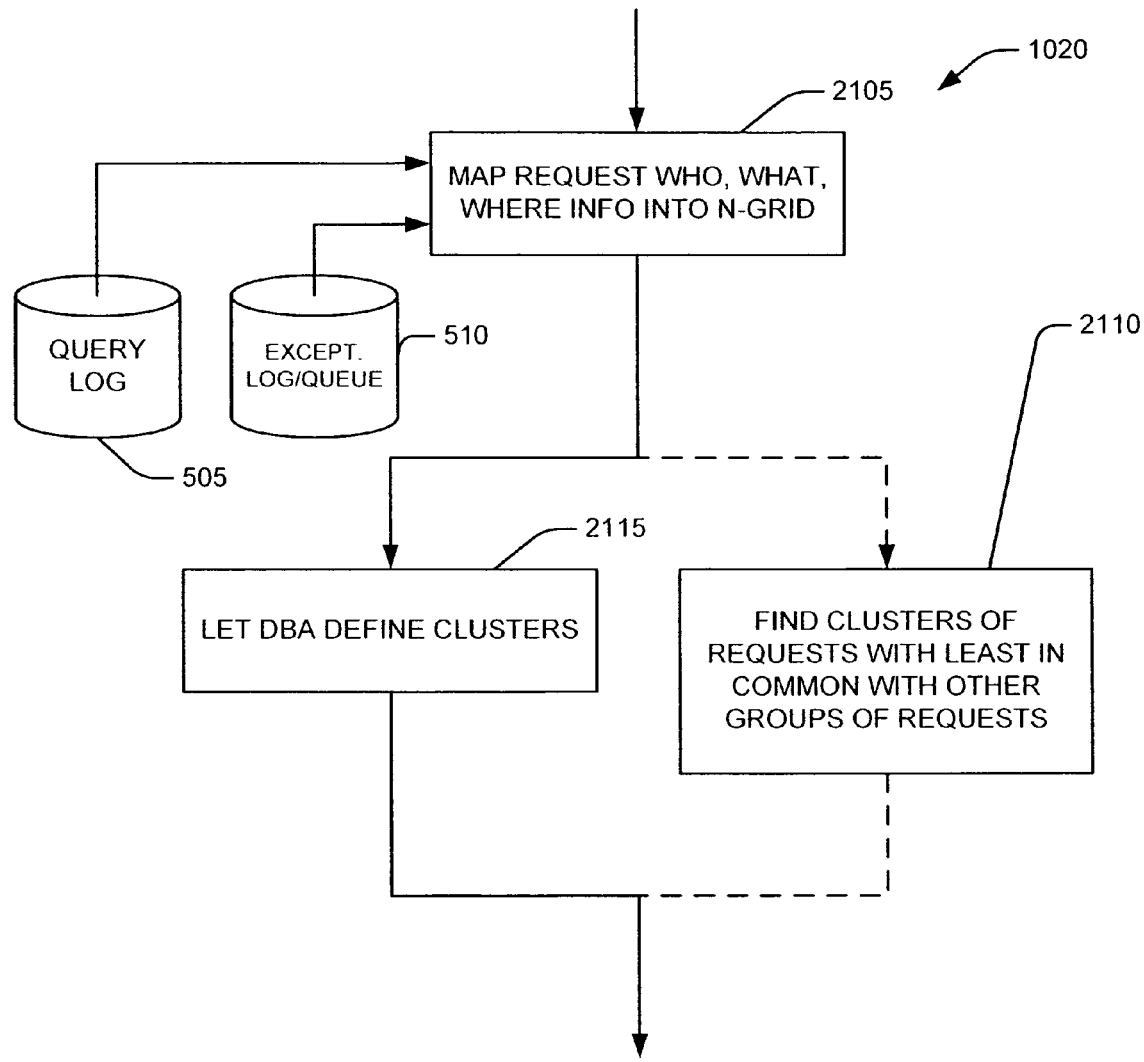

In one example, the system looks for clusters of requests within the WDs based on who, what, and where request information, as shown in FIG. 21, by mapping request who, what and where information, which is retrieved from the query log 505 and the exception log 510, into an N-grid (block 2105). A simple example 2-grid using request response time information is provided below (the horizontal axis is for response time and the vertical axis is for requests):

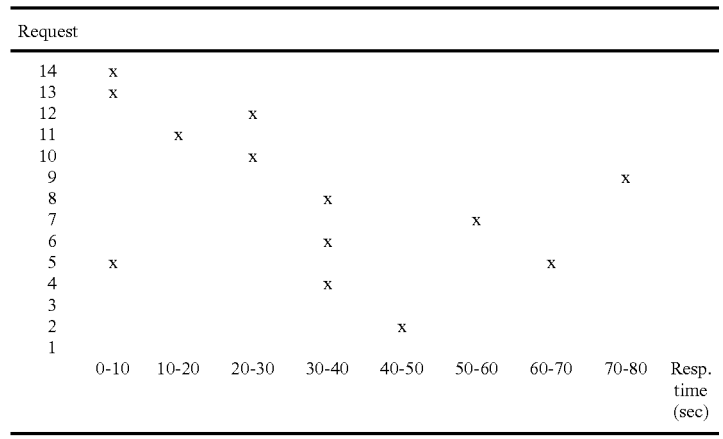

The system finds clusters of requests with the least in common with other groups of requests (block 2110). The simplistic case shown above suggests the following clusters, base d only on response time:
 a. Requests 5, 13 and 14;
 b. Requests 10 and 12;
 c. Requests 4, 6 and 8.

This example could be extended into a third dimension by adding a consideration of other who, what or where information associated with each query. Similarly, the example could be extended to N dimensions with the consideration of another N−1 types of information. The identification of clusters would proceed similarly.

Another example of information that might be used to identify clusters arises from an ability of the system to choose the "threshold or summary" level logging option. If this option is selected, requests are logged into either a summary query log or a detailed query log. For example, if the option is selected and the DBA specifies "Threshold=3", then all requests that run in 3 seconds or more are logged to the detailed query log. All requests that require less than 3 seconds to run are logged into the summary query log, which is essentially a count of requests tagged with "who" information. If the DBA specifies "Threshold>3 CPU or I/O" then the system would only log into the detailed query log those requests that used at least 3 CPU seconds or 3 I/Os. This information can readily be used to profile requests, applications, users, etc.

Still another example of information that might be used to identify clusters arises from a "Summary" query logging option, which counts requests into buckets. For example, if the DBA specifies "Summary 0 10 20", requests are summarized and counted into three buckets; 0-10, 10-20, and 20-30. Again, this information can readily be used to profile requests, applications, users, etc.

Preferably, rather than allowing the system to identify the clusters, the DBA defines the clusters based on an examination of the N-grid illustrated as shown above or by some other means (block 2115).

Figure 22:
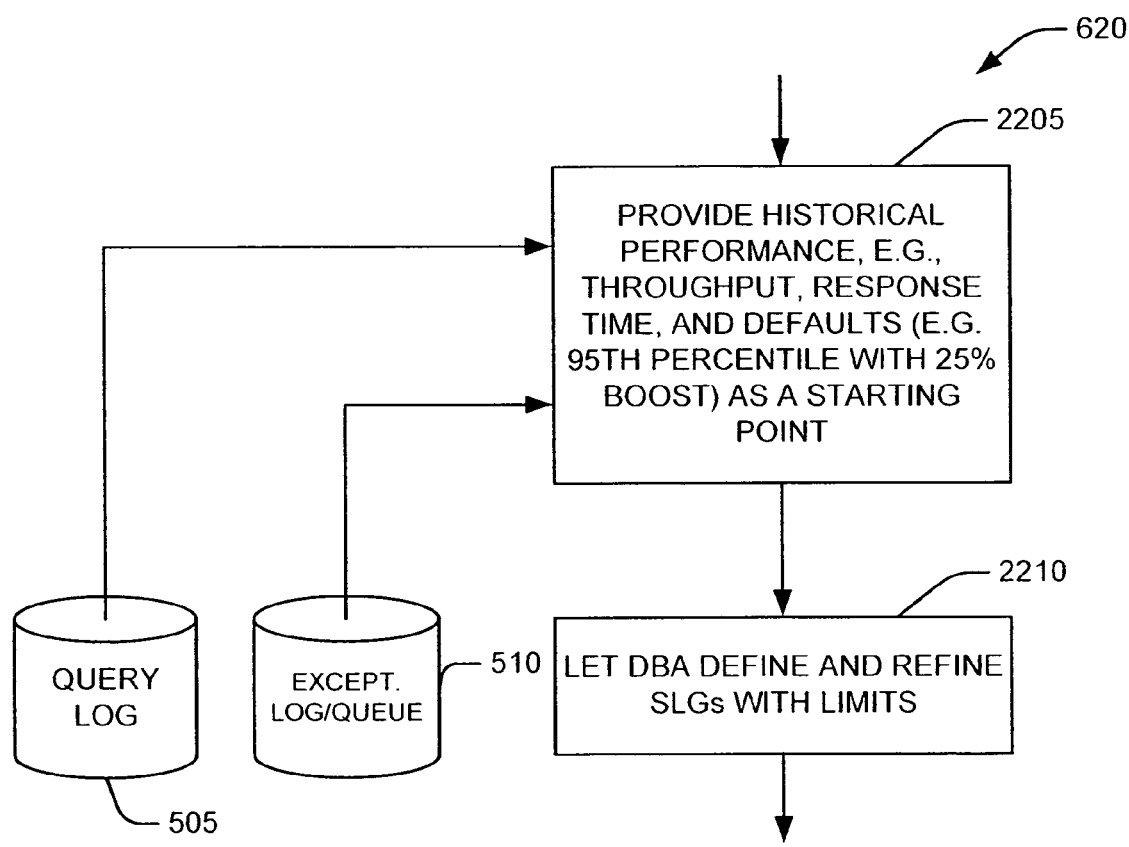

The process of defining SLGs for WDs (block 1620), shown in more detail in FIG. 22, begins with the system providing historical performance information, such as throughput and response time, and defaults (e.g., requests from a WD to meet SLGs 95 percent of the time, with a 25 percent boost on performance), as a starting point (block 2205). The historical information is retrieved, for example, from the query log 505 and the exception log 510. The DBA can then define and refine the SLGs within limits prescribed by the system (block 2210).

Figure 23:
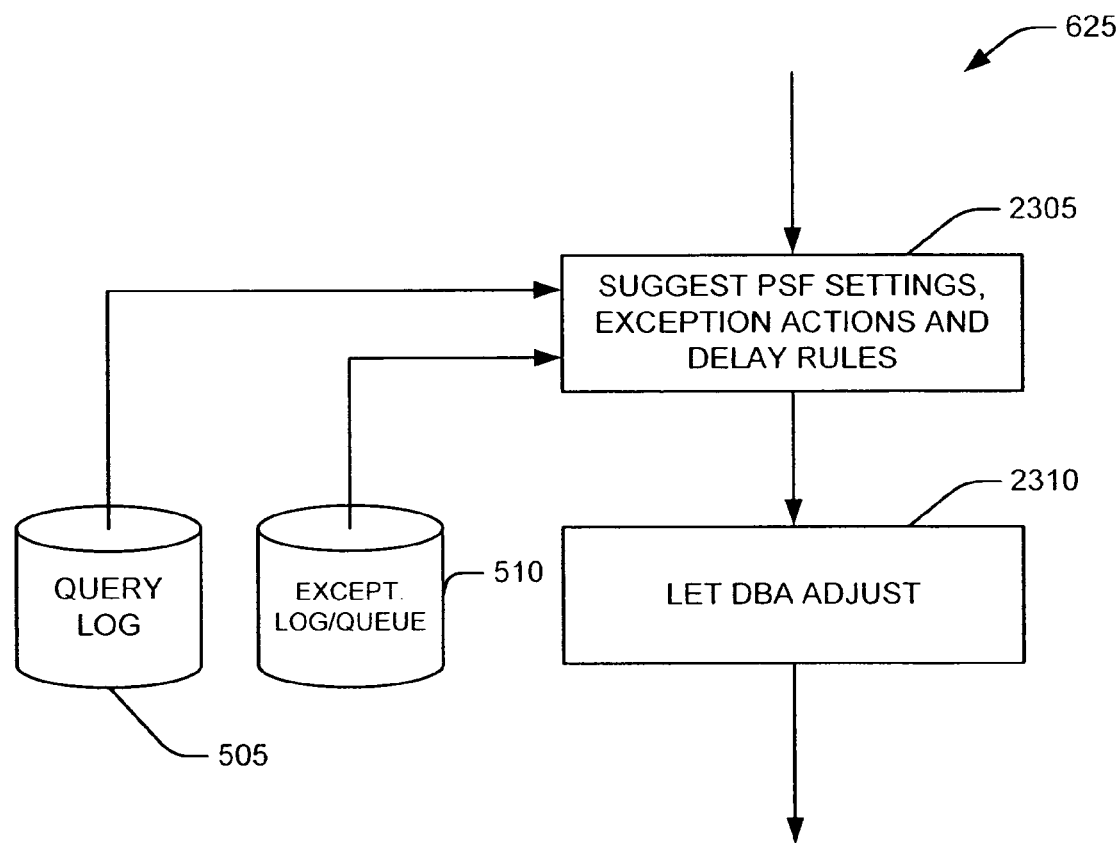

The process of defining PSF settings for WDs (block 1625), shown in more detail in FIG. 23, begins with the system suggesting PSF settings, exception actions and delay rules based on SLGs (e.g. throughput, response time), SLG enforcement requirements based on the business value of the workload and resource consumption requirements (block 2305). The information used in making the suggestions is retrieved, for example, from the query log 505 and the exception log 510. The system then allows the DBA to adjust the PSF settings within limits prescribed by the system (block 2310).

Internal Monitoring and Regulation of Workload Groups (Regulator)

Figure 6:
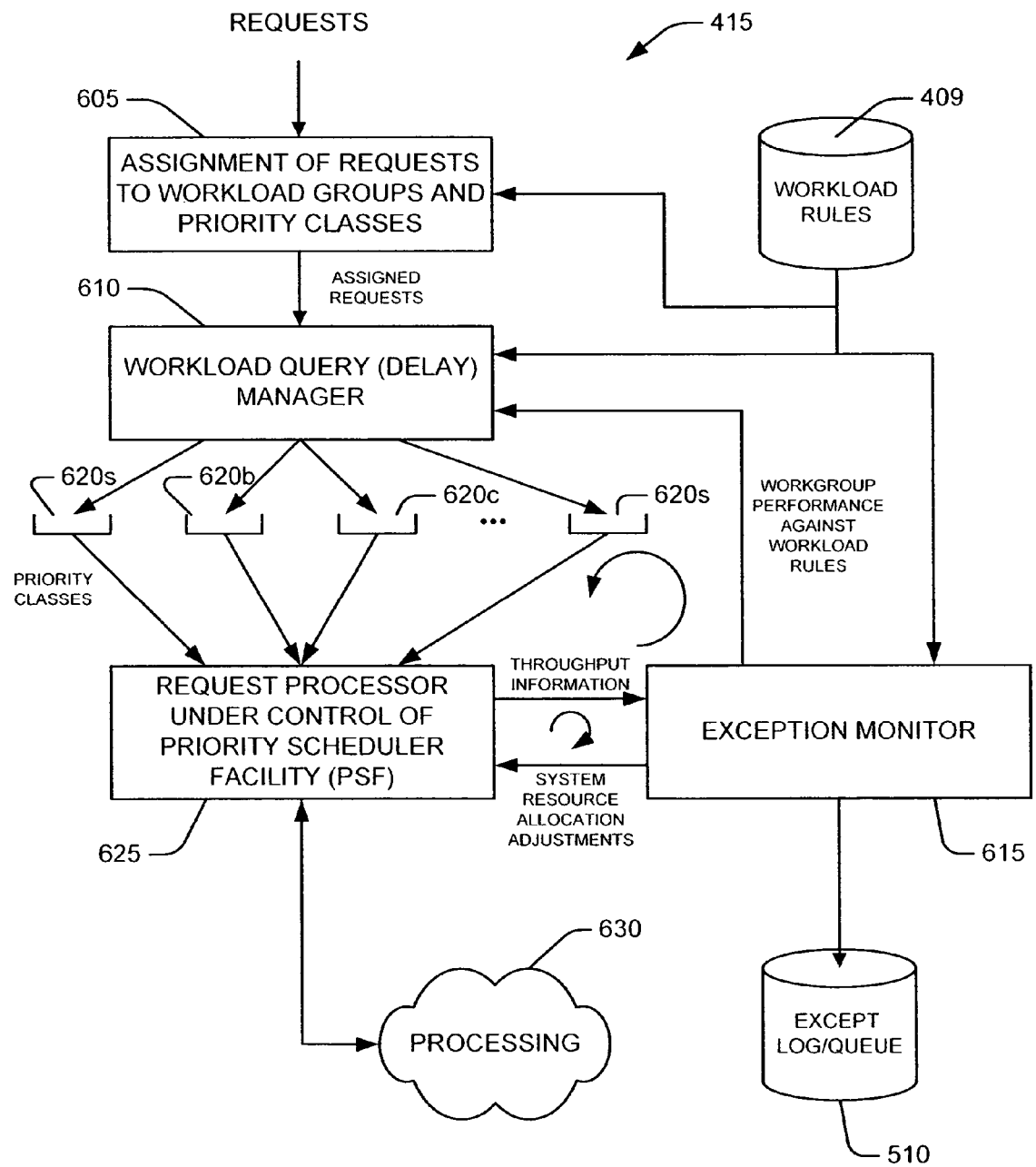

The internal monitoring and regulating component (regulator 415), illustrated in more detail in FIG. 6, accomplishes its objective by dynamically monitoring the workload characteristics (defined by the administrator) using workload rules or other heuristics based on past and current performance of the system that guide two feedback mechanisms. It does this before the request begins execution and at periodic intervals during query execution. Prior to query execution, an incoming request is examined to determine in which workload group it belongs, based on criteria described below with respect to FIG. 11. Concurrency levels, i.e., the numbers of concurrent executing queries from each workload group, are monitored, and if current workload group concurrency levels are above an administrator-defined threshold, a request in that workload group waits in a queue prior to execution until the concurrency level subsides below the defined threshold. Query execution requests currently being executed are monitored to determine if they still meet the criteria of belonging in a particular workload group by comparing request execution characteristics to a set of exception conditions. If the result suggests that a request violates the rules associated with a workload group, an action is taken to move the request to another workload group or to abort it, and/or alert on or log the situation with potential follow-up actions as a result of detecting the situation. Current response times and throughput of each workload group are also monitored dynamically to determine if they are meeting SLGs. A resource weight allocation for each performance group can be automatically adjusted to better enable meeting SLGs using another set of heuristics described with respect to FIG. 6.

As shown in FIG. 6, the regulator 415 receives one or more requests, each of which is assigned by an assignment process (block 605) (the system may have more than one assignment process; for example, the system may have one assignment process per dispatcher) to a workload group and, optionally, a priority class, and an enforcement priority (e.g. Tactical, Priority, Medium, Low, and Batch) in accordance with the workload rules 409. The assigned requests are passed to a workload query (delay) manager 610, which is described in more detail with respect to FIG. 7. In general, the workload query (delay) manager monitors the workload performance compared to the workload rules and either allows the request to be executed immediately or holds it for later execution, as described below. If the request is to be executed immediately, the workload query (delay) manager 610 places the request in the priority class bucket 620a . . . s corresponding to the priority class (i.e., workload group) to which the request was assigned by the administrator 405. A request processor under control of a priority scheduler facility (PSF) 625 selects queries from the priority class buckets 620a . . . s, in an order determined by the enforcement priority associated with each of the buckets, and executes it, as represented by the processing block 630 on FIG. 6.

The request processor 625 also monitors the request processing and reports throughput information, for example, for each request and for each workload group, to an exception monitoring process 615. The exception monitoring process 615 compares the throughput with the workload rules 409 and stores any exceptions (e.g., throughput deviations from the workload rules) in the exception log/queue. In addition, the exception monitoring process 615 provides system resource allocation adjustments to the request processor 625, which adjusts system resource allocation accordingly, e.g., by adjusting the priority scheduler weights. Further, the exception monitoring process 615 provides data regarding the workgroup performance against workload rules to the workload query (delay) manager 610, which uses the data to determine whether to delay incoming requests, depending on the workload group to which the request is assigned.

As can be seen in FIG. 6, the system provides two feedback loops, indicated by the circular arrows shown in the drawing. The first feedback loop includes the request processor 625 and the exception monitoring process 615. In this first feedback loop, the system monitors on a short-term basis the execution of requests to detect deviations greater than a short-term threshold from the defined service level for the workload group to which the requests were defined. If such deviations are detected, the DBMS is adjusted, e.g., by adjusting the assignment of system resources to workload groups. The second feedback loop includes the workload query (delay) manager 610, the request processor 625 and the exception monitoring process 615. In this second feedback loop, the system monitors on a long-term basis to detect deviations from the expected level of service greater than a long-term threshold. If it does, the system adjusts the execution of requests, e.g., by delaying, swapping out, throttling, or aborting requests, to better provide the expected level of service. Note that swapping out requests is one form of memory control in the sense that before a request is swapped out it consumes memory and after it is swapped out it does not. While this is the preferable form of memory control, other forms, in which the amount of memory dedicated to an executing request can be adjusted as part of the feedback loop, are also possible.

Figure 7:
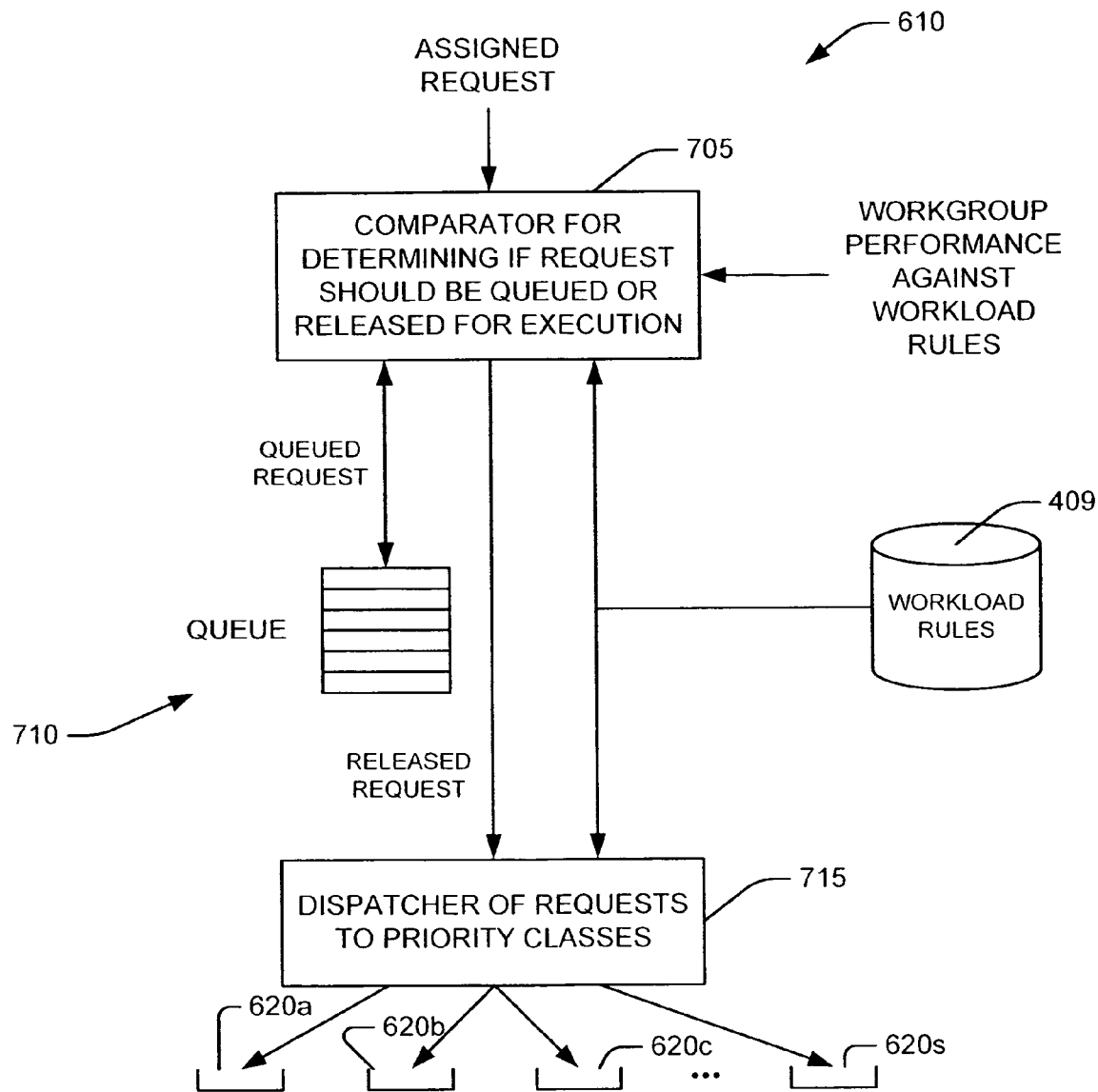

The workload query (delay) manager 610, shown in greater detail in FIG. 7, receives an assigned request as an input. A comparator 705 determines if the request should be queued or released for execution. It does this by determining the workload group assignment for the request and comparing that workload group's performance against the workload rules, provided by the exception monitoring process 615. For example, the comparator 705 may examine the concurrency level of requests being executed under the workload group to which the request is assigned. Further, the comparator may compare the workload group's performance against other workload rules.

If the comparator 705 determines that the request should not be executed, it places the request in a queue 710 along with any other requests for which execution has been delayed. Queue 710 may represent a set of queues. In some example systems, the set of queues 710 includes one queue for each workload group. Thus, when a request is placed in the queue 710 it is placed in the queue associated with the appropriate workload group. For example, if a Tactical workload group has a concurrency limit defined then all Tactical queries would be placed on the Tactical delay queue when the limit is reached. Subsequently, if a Long Running Queries workload group has a concurrency limit then the Long Running Queries would be queued on the "Long Running Query" queue, and so on. The comparator 705 continues to monitor the workload group's performance against the workload rules and when it reaches an acceptable level, it extracts the request from the appropriate queue of the set of queues 710 (i.e., the queue associated with the workload group) and releases the request for execution. In some cases, it is not necessary for the request to be stored in the queue to wait for workgroup performance to reach a particular level, in which case it is released immediately for execution.

Once a request is released for execution it is dispatched (block 715) to priority class buckets 620a . . . s, where it will await retrieval by the request processor 625. For example, in the case of SMP/MPP systems, this may be an All-AMP or single-AMP broadcast message to all AMPs or a single AMP in the system.

Figure 8:
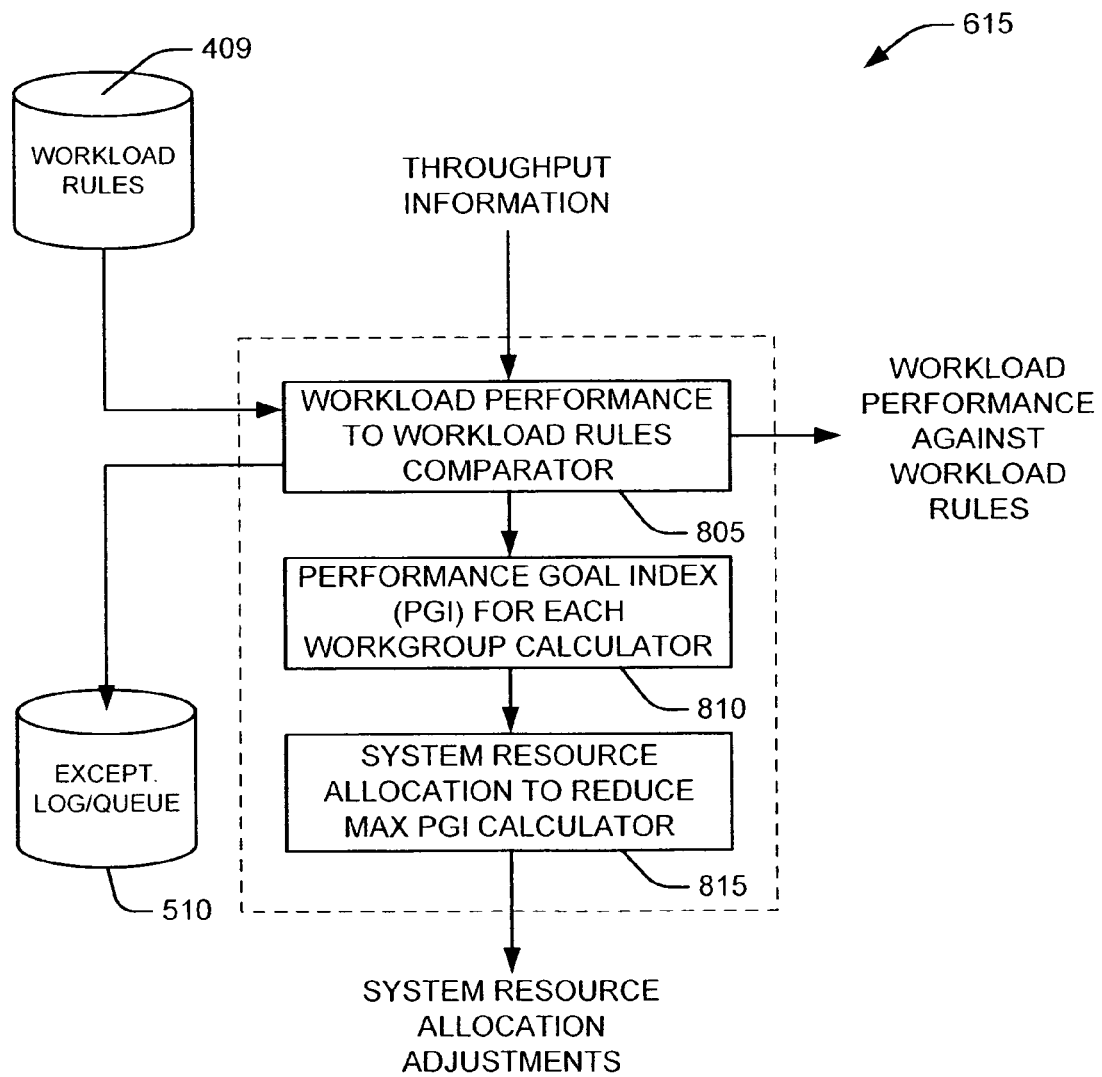

The exception monitoring process 615, illustrated in greater detail in FIG. 8, receives throughput information from the request processor 625. A workload performance to workload rules comparator 805 compares the received throughput information to the workload rules and logs any deviations that it finds in the exception log/queue 510. It also generates the workload performance against workload rules information that is provided to the workload query (delay) manager 610.

To determine what adjustments to the system resources are necessary, the exception monitoring process calculates a 'performance goal index' (PGI) for each workload group (block 810), where PGI is defined as the observed average response time (derived from the throughput information) divided by the response time goal (derived from the workload rules). Because it is normalized relative to the goal, the PGI is a useful indicator of performance that allows comparisons across workload groups.

The exception monitoring process adjusts the allocation of system resources among the workload groups (block 815) using one of two alternative methods. Method 1 is to minimize the maximum PGI for all workload groups for which defined goals exist. Method 2 is to minimize the maximum PGI for the highest priority workload groups first, potentially at the expense of the lower priority workload groups, before minimizing the maximum PGI for the lower priority workload groups. Method 1 or 2 are specified by the DBA in advance through the administrator.

The system resource allocation adjustment is transmitted to the request processor 625 (discussed above). By seeking to minimize the maximum PGI for all workload groups, the system treats the overall workload of the system rather than simply attempting to improve performance for a single workload. In most cases, the system will reject a solution that reduces the PGI for one workload group while rendering the PGI for another workload group unacceptable.

This approach means that the system does not have to maintain specific response times very accurately. Rather, it only needs to determine the correct relative or average response times when comparing between different workload groups.

In summary the regulator:
- a) Regulates (adjusts) system resources against workload expectations (SLGs) and projects when response times will exceed those SLG performance thresholds so that action can be taken to prevent the problem.
- b) Uses cost thresholds, which include CPU time, 10 count, disk to CPU ratio (calculated from the previous two items), CPU or 10 skew (cost as compared to highest node usage vs. average node usage), spool usage, response time and blocked time, to "adjust" or regulate against response time requirements by workload SLGs. The last two items in the list are impacted by system conditions, while the other items are all query-specific costs. The regulator will use the PSF to handle dynamic adjustments to the allocation of resources to meet SLGs.
- c) Defers the query(ies) so as to avoid missing service level goals on a currently executing workload. Optionally, the user is allowed to execute the query(ies) and have all workloads miss SLGs by a proportional percentage based on shortage of resources (i.e., based on administrators input), as discussed above with respect to the two methods for adjusting the allocation of system resources.

Monitoring System Performance (Monitor)

The monitor 410 (FIG. 4) provides a hierarchical view of workload groups as they relate to SLGs. It provides filtering options on those views such as to view only active sessions versus all sessions, to view only sessions of certain workload groups, etc.

The monitor:
- a) Provides monitoring views by workload group(s). For example, the monitor displays the status of workload groups versus milestones, etc.
- b) Provides feedback and diagnostics if expected performance is not delivered. When expected consistent response time is not achieved, explanatory information is provided to the administrator along with direction as to what the administrator can do to return to consistency.
- d) Identifies out of variance conditions. Using historical logs as compared to current/real-time query response times, CPU usage, etc., the monitor identifies queries that are out of variance for, e.g., a given user/account/application IDs. The monitor provides an option for automatic screen refresh at DBA-defined intervals (say, every minute.)
- e) Provides the ability to watch the progress of a session/query while it is executing.
- f) Provides analysis to identify workloads with the heaviest usage. Identifies the heaviest hitting workload groups or users either by querying the Query Log or other logs. With the heaviest usage identified, developers and DBAs can prioritize their tuning efforts appropriately.
- g) Cross-compares workload response time histories (via Query Log) with workload SLGs to determine if query gating through altered TDQM settings presents feasible opportunities for the workload.

The graphical user interface for the creation of Workload Definitions and their SLGs, shown in FIG. 9, includes a Workload Group Name column, which can be filled in by the DBA. Each row of the display shown in FIG. 9 corresponds to a different workload group. The example screen in FIG. 9 shows the "Inventory Tactical" workload group, the "CRM Tactical" workload group and others. For each workload group, the DBA can assign a set of service level goals. In the example shown in FIG. 9, the service level goals include the "desired response & service level" and "enforcement policy." The desired response & service level for the Inventory Tactical workload group is "<=1 sec@95%", which means that the DBA has specified that the Inventory Tactical workload group goal is to execute within 1 second 95 percent of the time. The enforcement priority for the Inventory Tactical workload group is "Tactical", which gives this workload group the highest priority in achieving its desired response & service level goals. A lower priority, "Priority", is assigned to the Sales Short Qry workload group. As can be seen in FIG. 9, multiple workload groups can be assigned the same enforcement priority assignments. That is, the Sales Cont Loads, Inventory Tactical, CRM Tactical and Call Ctr Tactical workload groups all have "Tactical" as their enforcement priority.

Each workload group also has an "operating window," which refers to the period of time during which the service level goals displayed for that workload group are enforced. For example, the Inventory Tactical operating group has the service level goals displayed on FIG. 9 from 8 AM-6 PM. The service level goals can be changed from one operating window to another, as indicated below in the discussion of FIG. 10.

Each workload group is also assigned an arrival rate, which indicates the anticipated arrival rate of this workload. This is used for computing initial assignment of resource allocation weights, which can be altered dynamically as arrival rate patterns vary over time.

Each workload group is also assigned an "initiation instruction," which indicates how processes from this workload group are to be executed. An initiation instruction can be (a) "Expedite," which means that requests from this workload group can utilize reserved resources, known as Reserved Amp Worker Tasks, rather than waiting in queue for regular Amp Worker Tasks to become available, (b) "Exec," which means the request is executed normally, i.e.: without expedite privileges, or (c) "Delay," which means the request must abide by concurrency threshold controls, limiting the number of concurrent executing queries from this workload group to some specified amount. Initiation instructions are discussed in more detail with respect to FIG. 13.

Each workload group is also assigned an "exception processing" parameter, which defines the process that is to be executed if an exception occurs with respect to that workload group. For example, the exception processing for the Inventory Tactical workload group is to change the workload group of the executing query to Inventory LongQry, adopting all the characteristics of that workload group. Exception processing is discussed in more detail with respect to FIGS. 14-15.

Some of these parameters (i.e.: enforcement priority, arrival rate, initiation instructions, and exception processing) can be given different values over different operating windows of time during the day, as shown in FIG. 10. In the example shown in FIG. 10, three operating windows are defined: (a) 8 AM-6 PM (which corresponds to the operating window depicted in FIG. 9); (b) 6 PM-12 AM; and(c) 12 AM-8 AM.

Each of the highlighted zones in shown in FIG. 9 or 10 (i.e., the workload definition name, the initiation instructions and the exception processing definition) indicate buttons on the screen that can be activated to allow further definition of that parameter. For example, pressing the "Inv Tactical" button on FIG. 10 causes the screen shown in FIG. 11, which is the classification criteria for the Inventory Tactical workgroup, to be displayed. Through this screen, the DBA can define the request sources (who), the tables/views/databases that can be accessed (where) and/or the request resource usage predictions that can execute processes in the Inventory Tactical workgroup. The keywords shown in the highlighted boxes of FIG. 11 (who classification: User ID, Account ID, Profile, Appl Executable ID, Query Band ID, Client User ID, Client Source or Address; what classification: Estimated Time, Estimated Rows, AMPs involved, Join Type, Scan Type; where classification: Table Accessed, Database Accessed, View Accessed) can be used to formulate the query classification. In the example shown in FIG. 11, the "who" portion of the classification definition is:

All Users with Account "TacticalQrys"
and User not in (andy,john,jane)
and querybandID="These are really tactical"

Figure 11:
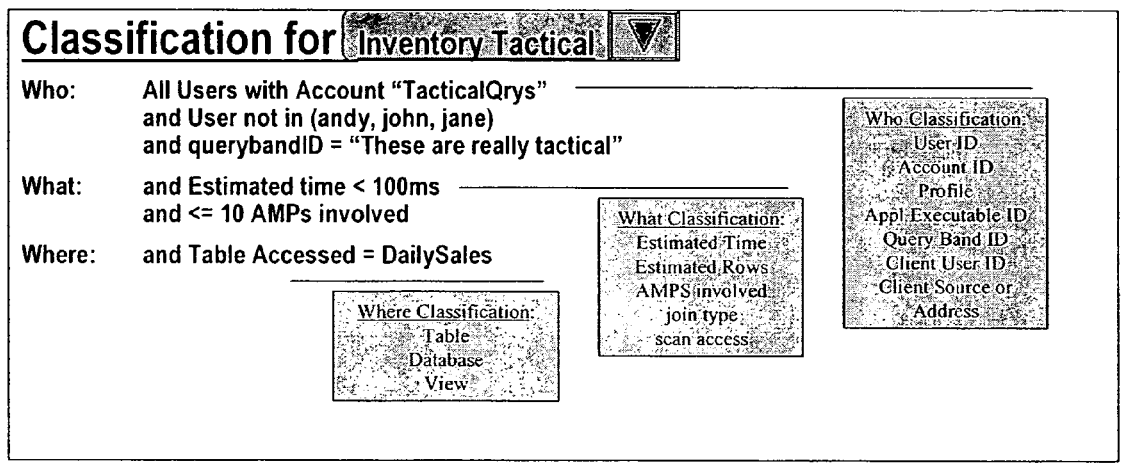

In the example shown in FIG. 11, the "what" portion of the classification has been defined as:

Estimated time<100 ms AND
<=10 AMPs involved

Note that the "estimated time" line of the "what" portion of the classification could be rephrased in seconds as "Estimated time<0.1 seconds AND".

In the example shown in FIG. 11, the "where" portion of the classification has been defined as:

Table Accessed=DailySales

If one of the buttons shown under the exception processing column in FIGS. 9 and 10 is pressed, the screen shown in FIG. 12 appears, allowing specification of the exception conditions and processing for the selected workload group. The keywords shown in the highlighted box in the Exception Thresholds zone of the screen shown in FIG. 11 (Spool Usage, Actual Rows, Actual CPU Time, Actual IO Counts, CPU or IO Skew, Disk to CPU Ratio, Response Time and Blocked Time) can be used to formulate the Exceptions Thresholds criteria. If an exception occurs, and if the DBA desires the system to potentially continue the request under a different workload group, that workload group is defined here. In a sense, an exception indicates that the request is displaying query characteristics that are not in keeping with the norm for this workload group, so it must instead belong in the alternative workload group designated on the screen shown in FIG. 12. There are two exception conditions where this assessment could be in error: Response Time and Blocked Time. Both Response Time and Blocked Time can cause request performance to vary because of system conditions rather than the characteristics of the query itself. If these exception criteria are defined, in one example the system does not allow an alternative workload group to be defined. In one example system, some conditions need to be present for some duration before the system takes action on them. For example, a momentary skew or high disk to CPU ratio is not necessarily a problem, but if it continues for some longer period of time, it would qualify as a problem that requires exception processing. In the example shown in FIG. 12, the Exceptions Thresholds have been defined as:

CPU Time (i.e., CPU usage)>500 ms and
(Disk to CPU Ratio>50) or (CPU Skew>40%)) for at least 120 seconds Clicking on one of the buttons under the "initiation instruction" column in the display shown in FIGS. 9 and 10 causes the execution initiation instructions screen, shown in FIG. 13, to be displayed. For example, through the display shown in FIG. 13, the Execution Initiation Instructions for the Inventory Tactical workgroup for the operating window from 8 AM-6 PM can be displayed and modified. In the example shown in FIG. 13, the three options for Execution Initiation Instruction are "Execute (normal)," "Expedite Execution," and "Delay Until", with the last selection having another button, which, when pressed, allows the DBA to specify the delay conditions. In the example shown in FIG. 13, the Expedite Execution instruction has been selected, as indicated by the filled-in bullet next to that selection.

Returning to FIG. 10, the details of the Exception Processing parameter can be specified by selecting one of the highlighted buttons under the Exception Processing heading. For example, if the button for the 8 AM-6 PM operating window is pressed, the screen shown in FIG. 14 is displayed. The screen shown in FIG. 14 provides the following exception processing selections: (a) "Abort Request"; (b) "Continue/log condition (Warning Mode)"; and (c) "Continue/Change Workload Group to" the workload group allowed when the exception criteria were described in the screen shown in FIG. 12; and (d) "Continue/Send Alert to [pulldown menu for possible recipients for alerts]." If selection (a) is chosen, the associated request is aborted if an exception occurs. If selection (b) is chosen, an exception is logged in the exception log/queue 510 if one occurs. If selection (c) is chosen, and it is in the example shown in FIG. 14, as indicated by the darkened bullet, the request is automatically continued, but in the different work group pre-designated in FIG. 12. If selection (d) is chosen, processing of the request continues and an alert is sent to a destination chosen using the pulldown menu shown. In the example shown in FIG. 14, the chosen destination is the DBA.

Figure 15:
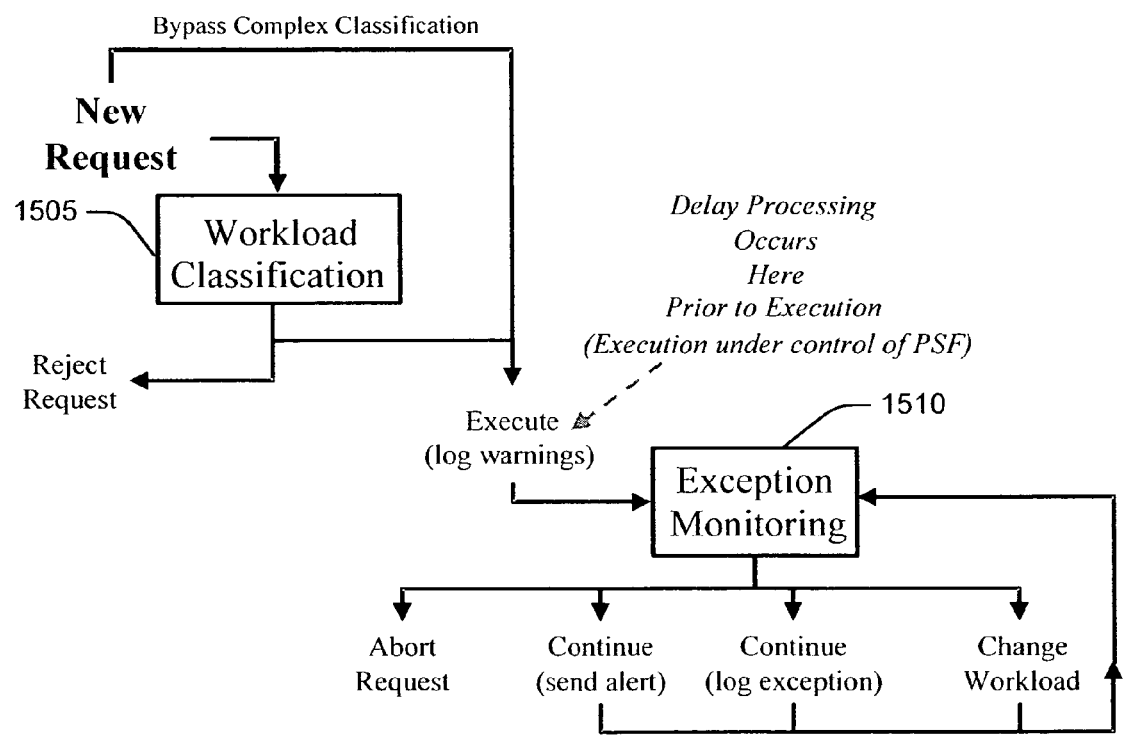
FIG. 15 is a flow chart illustrating the flow of workload processing.

The flow of request processing is illustrated in FIG. 15. A new request is classified by the workload classification block 1505 in which it is either rejected, and not executed, or accepted, and executed. As shown in FIG. 15, the execution delay set up using the screen illustrated in FIG. 13 occurs prior to execution under the control of PSF. The execution is monitored (block 1510) and based on the exception processing selected through the screen illustrated in FIG. 14, the request is aborted, continued with an alert being sent, continued with the exception being logged, or continued with the request being changed to a different workload, with perhaps different service level goals.

Figure 4:
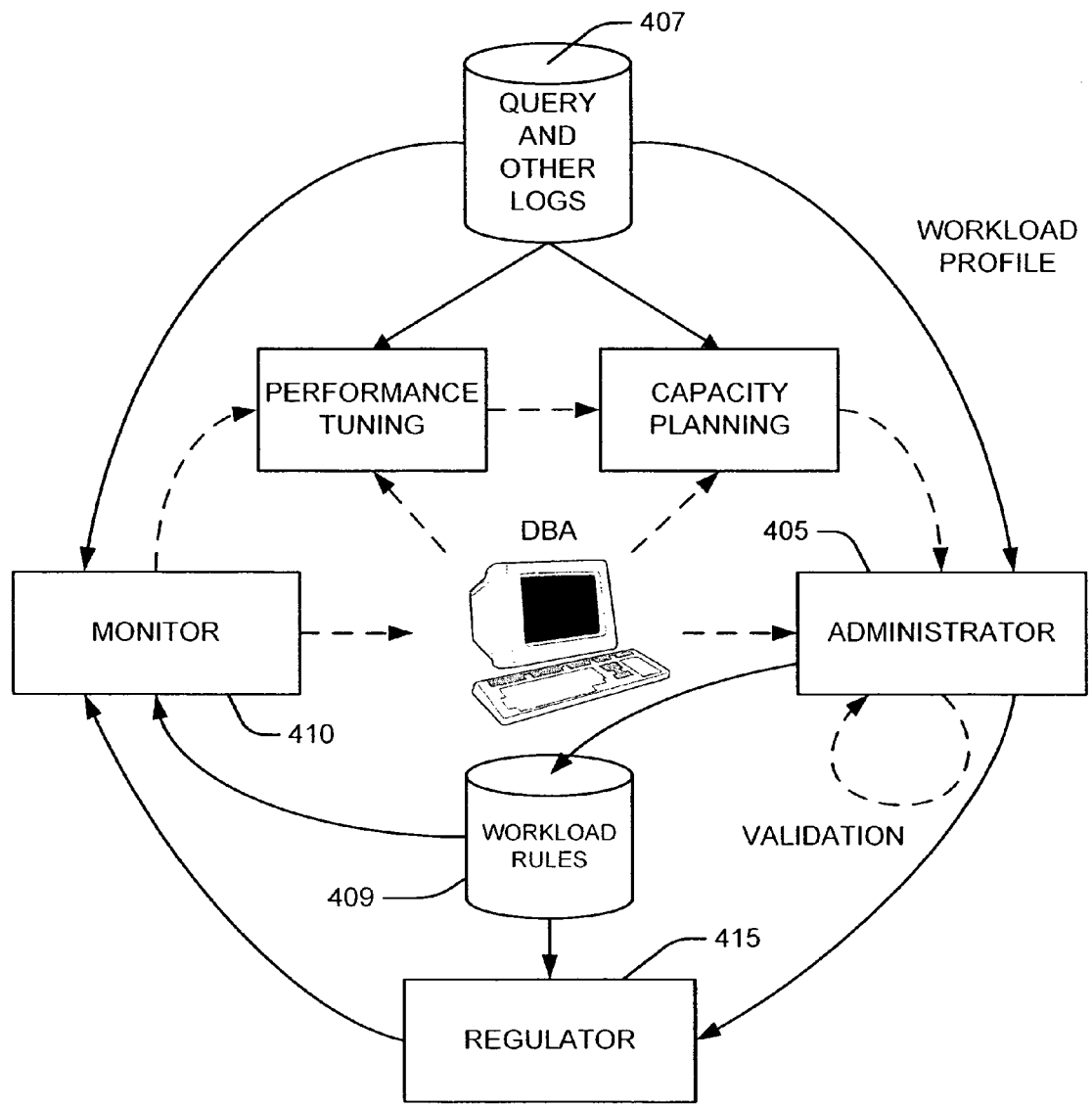
FIGS. 4-8, 16 and 20-23 are block diagrams of a system for administering the workload of a database system using feedback.
Figure 24:
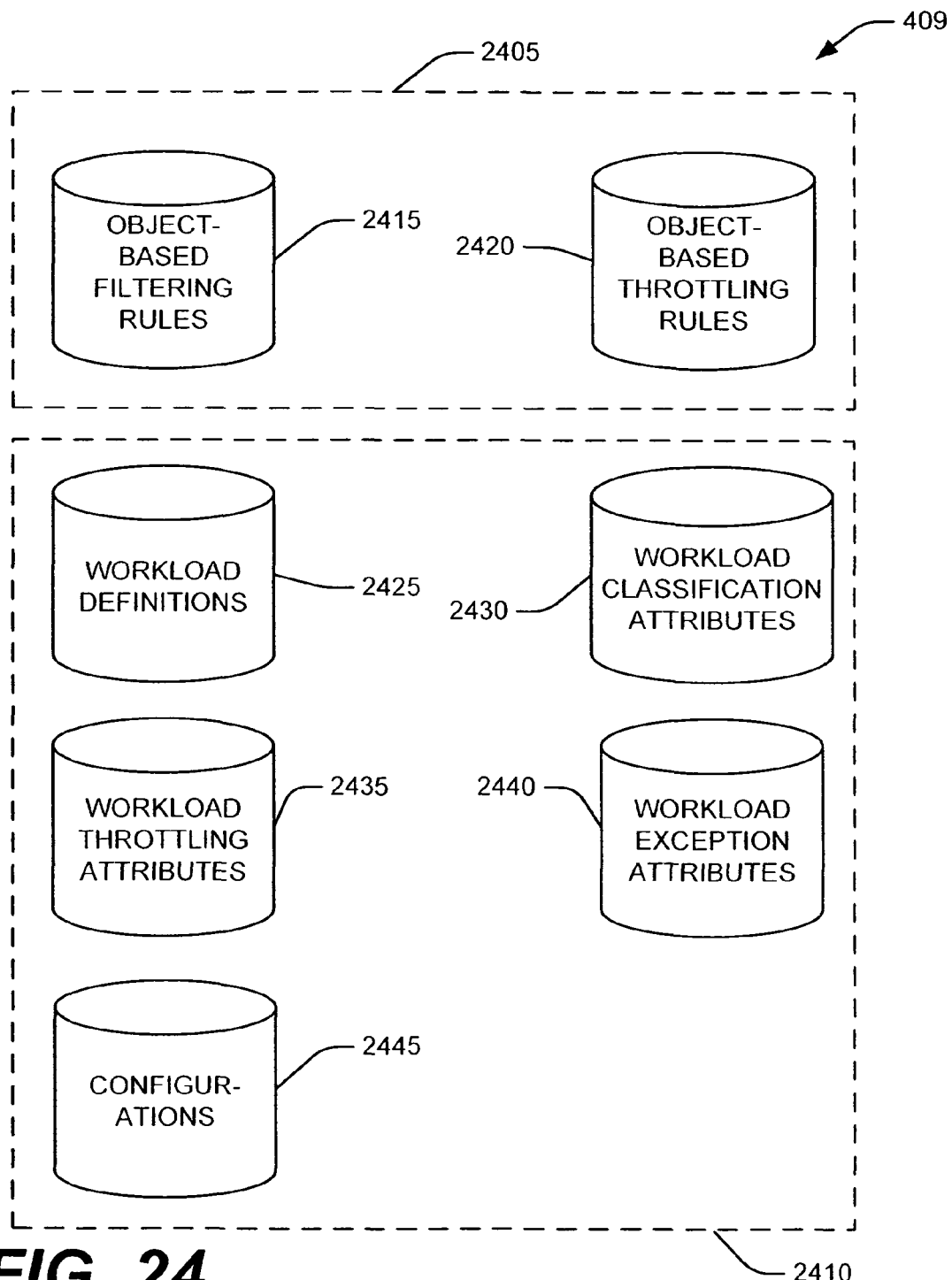
FIG. 24 illustrates workload rules.

A further description of the administrator, as part of the larger system illustrated in FIG. 4, which will be referred to as Teradata Dynamic Workload Management, or TDWM, will now be provided. The workload rules 409 (see FIGS. 5 and 24) include rules 2405 and workload definitions 2410. The rules 2405 include object-based filtering rules 2415 and object-based throttling rules 2420. The workload definitions 2410 include workload definitions 2425, workload classification attributes 2430, workload throttling attributes 2435, workload exception attributes 2440, and configurations 2445. The configurations define the unique configuration ids that are used by all table entries.

Object-based filtering rules 2415 are applied when a request is submitted to the database system before the request is executed. The database system either accepts the request for processing or rejects the request. In one example system, these rules match the existing filtering rules, which may be (a) who submitted, (b) what table accessed, (c) estimated processing, etc. Further, these rules may include an ability to filter on the type of statement, such as SELECT, INSERT, DELETE, etc. These rules are applied before a request is classified into a workload. An example of such a rule is:

Reject all non-SELECT requests that access the INVENTORY_HISTORY table.

The object-based throttling rules 2420 are applied when a request is submitted to the database management system before a request is executed. In one example system, object-based throttling rules 2420 are existing rules.

The object-based throttling rules 2420 may use object information (who submitted, what table accessed, etc.) to determine if the request should be executed immediately or put on a delay queue (e.g. queue 710, FIG. 7). For each throttling rule, the database administrator may define how many requests that match the rule may be running at one time. When the threshold is exceeded, new requests may be placed on the delay queue. Requests may be removed from the delay queue when one of the running requests completes. Load utilities also have throttling rules. An example of such an object-based throttling rule is:

No more than 10 requests from user A may run at one time.

Workload definitions 2425 are as described above.

Workload classification attributes 2430 may be applied when a request is submitted to the database management system. They determine the workload definition to which each request belongs. Requests may be classified using nearly any combination of many factors (who submits, what application, what objects are accessed, estimated processing time, etc.). AND, OR, and NOT conditions may be created by combining several classification rules for a single workload definition. An example of a workload classification attribute is:

The CRM_TACTICAL workload is composed of requests submitted by the CRM application that have an estimated CPU time of less than two seconds.

Workload throttling attributes 2435 may be applied after the request has been classified but before it is executed. Each workload may have a set of initiation attributes that apply to its requests that determine if requests are rejected, throttled, or run with special privileges. An example of the workload throttling attribute is:

No more than 15 requests in the CRM_ANALYTICS workload may be run at one time.

Workload exception attributes 2440 may be applied while a request is running. Each workload may have a set of exception rules that apply to its requests. The database management system may monitor the requests for the exception conditions (actual CPU time, actual I/O, actual response time, actual skew). The database administrator may determine the threshold for each exception condition. A workload definition may have different exception actions in different periods. An example of a workload exception attribute is:

If a request in the CRM_TACTICAL workload uses more than five CPU seconds, move it to the CRM_ANALYTICS workload.

These rules and definitions fall into three categories, as illustrated in FIG. 25. Category 1 includes the object-based filtering rules. Category 2 includes the object-based throttling rules. Category 3 includes all of the workload definitions, including workload definitions, workload classification attributes, workload throttling attributes, and workload exception attributes. The database administrator may enable or disable any (or all) level of workload management. Most object-based rules are valid whether workload management is enabled or not. Throttling based on request performance group is ignored when workload management is enabled. "Performance group" is a priority scheduler term used to indicate the mapping of workload definitions to an operating schedule or class of work.

Object-Based Filtering

The database administrator creates the access and object rules for filtering out requests before they are accepted by the database management system. Filtering rule creation may be a capability that is separate from the actual filtering.

If filtering is enabled (that is, if category 1 is enabled) each request is checked against object access and request resource filter rules, created using the filtering rule creation capability and maintained by the database management system.

Specific "who" objects can be set up to circumvent or bypass category 1 checking (for example, to bypass category 1 checking for specific types of users). If there is a rule against running a particular request, the request is rejected.

Rejection errors are reported back to the user and they are logged in the query log 505.

The different filtering attributes are illustrated in FIG. 26. The "when" filtering attributes include date and time. The "who" filtering attributes include User ID, Account ID, Application ID, Query Band, Client ID, Client Address, and Profile. The "what" filtering attributes include Estimated processing time, Estimated answer set, Type of statement, and Join, full data scan conditions. The "where" attributes include database, table, view, etc.

Object-Based Throttling

Session and/or request throttling can be created on various levels, including users, accounts, and performance group objects. In some example systems, performance group limits are ignored when category 3 is enabled. When category 3 is enabled, object-based throttling is replaced by having limits on requests within a workload definition.

Throttling values (i.e., limits on sessions and/or requests) can be placed on a user, an account, a performance group and combinations of user and performance group or account and performance group.

In some example systems, throttling values can also be placed on a profile and on each individual load utility. Further, under category 2, the system can override the database system MaxLoadTasks value, which is a value that represents the number of load utilities that can run in parallel. In one example system, the default value of MaxLoadTasks is 15. The default value can be changed through a throttling value rule. Some systems have a load utility limit, which cannot be exceeded.

In some example systems, object-based throttling rules also handle the same "who" and "where" objects as the rules in effect when the system is operating in category 1. In some example systems, object throttling rules are also circumvented by bypassed objects. In some example systems, the only object that can be bypassed is USER.

In some example systems, a throttle limit for requests may be placed on access objects such as user or performance group. The purpose of such a throttle limit is to limit the number of high-impact requests caused by a request that accesses all processing modules $110_1 \ldots _N$, which is sometimes called an all-AMP request, where AMP is an abbreviation for Access Module Processor. With the advent of workload definitions, all requests, not just all-AMP requests, are subject to throttles. This means that there are two distinct meanings to throttle limits depending on whether access objects or workload definitions are being throttled. The administrator may indicate whether all requests or only all-AMP requests should be used in the counting of active requests against the throttle limit. Accounting for all requests may require substantial overhead processing. Consequently, this option is expected to be used in specific instances, such as a specific user that must be completely stopped from issuing requests. Limits on load utilities are the number of instances of utilities, not requests as in workload definitions (category 3).

The database administrator characterizes workload behavior through workload definitions. The database management system may assign a request to a workload definition based on the request attributes and the workload definitions.

Workload definition criteria may include classification, exception criteria and actions, period specification, service level goals and enforcement priority. Enforcement priority indicates the degree of importance of the workload definition. Workload definitions can have different characteristics during different time periods as system workload levels and response times change throughout the day or week or month.

Each workload definition is assigned to a performance group by the database management system. The workload definition will run in its assigned performance group under the PSF 625. The administrator may generate default workload definitions, used for requests that are not classified into any other workload definition or for those requests that do not have optimizer costs generated for them.

The administrator may also assign a number to the workload definition. In one example system, the workload definition numbers are not reused as new rules are made. History log entries, which contain a workload definition number, can always be tracked back to a workload definition.

The workload definition needs for the TDWM are generated by the database administrator using data collected via the profiler 515 and other data sources.

Figures 27, 28:
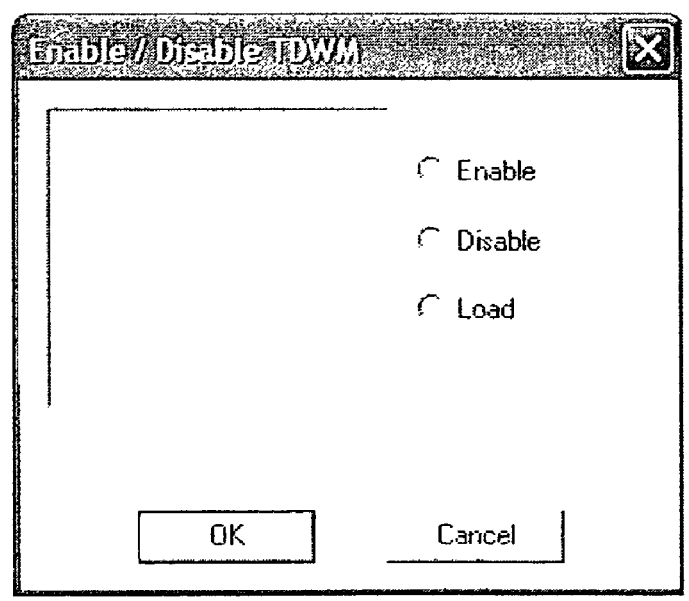

In some example systems, the administrator provides a tree view on the left side of a display screen, such as that shown in FIG. 27. The tree view shows a top level node for category 1 and 2 rules. It may also include a node for each category 1 and category 2 rule. The tree structure also includes top level nodes for workload administration and priority scheduler. When the administrator starts, it reads the TDWM database and populates the tree view.

When the user selects a "terminal" node, such as "Period 1" (which has no nodes with greater levels of indention immediately beneath it), a view of the data defined for that node will appear on the right side of the screen.

For each item in the tree view, it will be possible to invoke a right click pop-up menu with choices appropriate to the item, including:
  Display a New Window;
  New Item Duplicate;
  New Item Delete; and
  New Item, etc.

When the user selects a terminal tree node and changes the contents of the node, two buttons will be enabled: "OK" and "Cancel." If the user selects another tree node before either button is clicked, a warning message will be displayed to chose one of the displayed options. When the user selects "periods" or "workload definitions" on the tree, a list view (or spreadsheet) with a row for each item on the tree beneath the selected period or workload definition may be provided to present a summary of the periods or workload definitions. In some systems, the list view will be read only. If the user clicks on a row in the list view, the corresponding item is selected in the tree and the right view is changed to provide information for that item.

In some example systems, the period overview will have a grid with a column for the period name and a column containing a brief textual description of the definition. When the user clicks on a row in the grid, it will have the same effect as clicking on that period in the tree. That is, it will display the period property sheet on the right hand side of the screen.

When the user clicks "workload definitions" in the tree, the right band side of the screen will display a list of defined workloads along with service level goals, arrival rate, initiation instruction and exception processing. In some example systems, the list will be sortable on the first column. In other example systems, the table will be sortable on all columns.

Some example systems will provide a drop-down list of defined periods. When the user selects a period, the administrator will fill the list with the data for that period. When the user selects a row and clicks in the first column (e.g. workload definition name), the administrator will display that workload and the classification tab.

When the user selects a row and clicks in any column other than the first column, the administrator will display that workload displaying the workload period tab with the current period in the summary selected. When workload definitions are selected in the tree, and a command appears on the right-click menu, those commands will have buttons, including Add, Delete and Split.

When the administrator starts up, it verifies the TDWM tables have been created and initialized. If they have not, the user is prompted to create the tables. If the user has proper permissions, the tables are created. If not, the user is referred to the system administrator. Once the TDWM tables have been created and initialized, the administrator reads and validates the TDWM configuration and TDWM PSF template (i.e. tables in the database TDWM that contain PSF configuration information) on the database management system.

The administrator then determines if TDWM category 3 has been enabled on the database management system. If not, the user may still use the administrator to define workload definitions or to retrieve a set of workload definitions from a file.

The system provides default workload definitions. One example system includes five default workload definitions. Each of the four standard performance groups (R, H, M and L) will have a workload definition. R, H, M. and L are abbreviations for Rush, High, Medium and Low, respectively. In one example system, each of these standard workload definitions is available by default. A fifth default, called, "NoHome."

A procedure outside the administrator may process current schmon settings, which are settings associated with the schmon utility that monitors operating system task and thread usage on the system, and other parameters and create an initial workload definition configuration. The initial workload definition configuration will be a set of entries in the TDWM tables.

When the administrator starts for the first time, it may load this configuration so that the user has a starting point for defining workload definitions.

The administrator may provide two entries on its main menu for workload and priority schedule order. These entries will be enabled only when the workload definition feature is present on the user's system. The workload entry will have menu items for:

New Period;
New Workload;
New Classification;
New Exclusion;
New Workload Period;
Get Current Period;
Enable/Disable;
Compare Weights;
Show;
Show All;
Etc.

Each menu selection may only be enabled when an appropriate node is selected in the left panel tree.

The priority scheduler entry may have the following menu items:

Resource Partitions;
Allocation Groups;
Allocation Group Periods;
Workload Mapping;
Etc.

For each of the items in the workload and priority scheduler menus, when the user selects the item, a dialog screen may be displayed in the right panel. Each of the CFormView derivatives may have edit boxes and other controls for the user to enter appropriate values. Wherever possible, the administrator may provide the user all accessible choices for a value and may validate all data before accepting it.

The Get Current Period command may cause the database management system to retrieve the period then in effect. The database administrator can then look at the specifications for that period to investigate system operation.

The Enable/Disable dialog may list the TDWM configurations that have been saved in the TDWM tables, as shown in FIG. 28. The user can select a configuration and enable it by selecting the enable button and clicking OK, which will cause the configuration to be loaded into the administrator. Selecting disable and clicking OK may disable the workload classification (assuming category 3 is enabled). Selecting a configuration, selecting the load button and clicking OK may load the TDWM configuration into the TDWM administrator without affecting the current state of TDWM on the database management system.

The Compare Weights command may cause the system to numerically calculate the relative weights and provide a graphical representation of the weights. The relative weights of resource partitions (RPs) are shown by column width and relative weight of allocation groups by column segment height. "Resource partition" is a priority scheduler term used to describe the division of operating system resources. "Allocation group" is another priority scheduler term that describes the mapping of priority scheduler information to performance groups.

The Show command may display, in a separate pop-up window, a textual description of the node selected, depending on the level of the node selected in the tree. The window may have Save (to file) and Print buttons.

When the user clicks on Workload Administration in the tree (FIG. 27), a parameter dialog may display all of the global parameters for TDWM. Global parameters are those that pertain to the TDWM function and not to any specific workload definition. Global parameters include:

Workload Management Enabled/Disabled (true or false);
Workload Exception Interval;
Summary Log Interval; and
Log Flush Interval.

Figures 29, 30, 31:
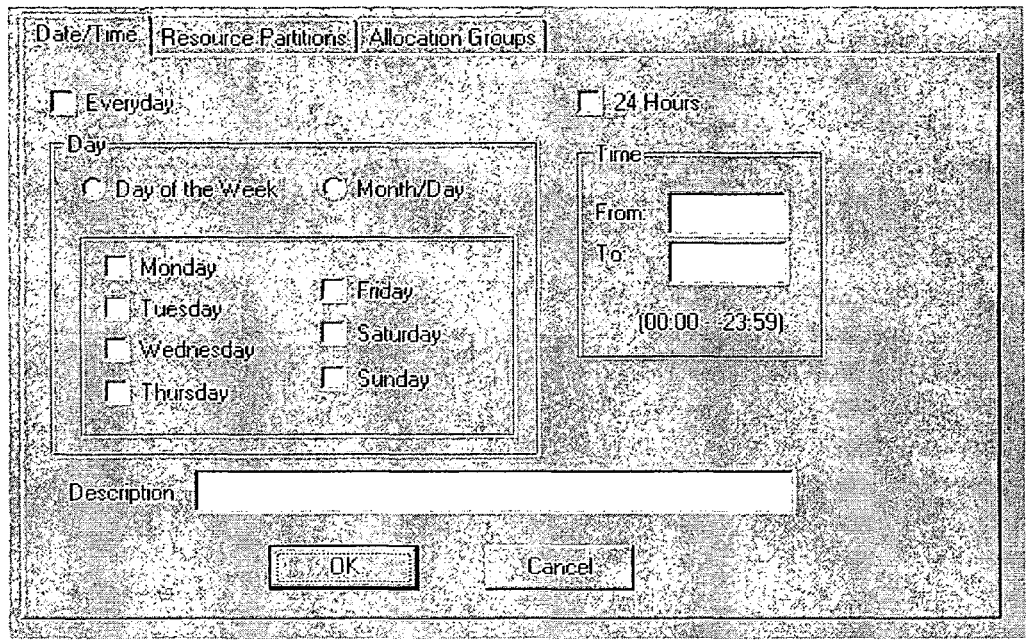

Periods are global elements that can be used by any workload definition. A period may be displayed as a multi-tab view property sheet, as shown in FIG. 29. Such a period property sheet includes tabs for date/time, resource partitions, and allocation groups.

The date/time tab allows behaviors to be specified for the workload definition for different times of the day, which are specified by the "from" time field, the "to" time field and the applicable days and months fields. In some example systems, a default period is defined, in which the "every day" box is selected and the 24 hours box is selected. This period may be used when no other period is applicable. A description field for a defined period may appear in the tree view. The resource partitions view, illustrated in FIG. 30, will include a grid, which will have a row for RP name, a row for RP assigned weight, and a row for RP relative weight. Only RPs with a non-zero weight will be defined. The user defines an RP by giving it a weight and drops it by setting the weight to zero. When the RP becomes active, the name is set to the RP ID (for RPs other than RP0). Only RPs that the user has defined (weight greater than zero) can be edited. RP names, weight or relative weight can be edited. When one of weight or relative weight is edited, the other value is also changed. RP names are the same across all periods.

The user may define parameters for the default periods first. Then any blank fields in other periods will be filled in with values from the default period. The user may then change values as needed.

The allocation group tab, illustrated in FIG. 31, includes a grid which has columns for allocation group name, weight, reserved AMP Worker Tasks ("AWT"), which is a database term equivalent to the Unix terms "thread" or "process," and enforcement priority. The user may define parameters for the default period first. In some example systems, for every other period, the values will be filled in with values from the default period. The user may then change values as needed. The enforcement priority field is set by the administrator using the enforcement priority of the first workload definition that uses the allocation group.

Figure 32:
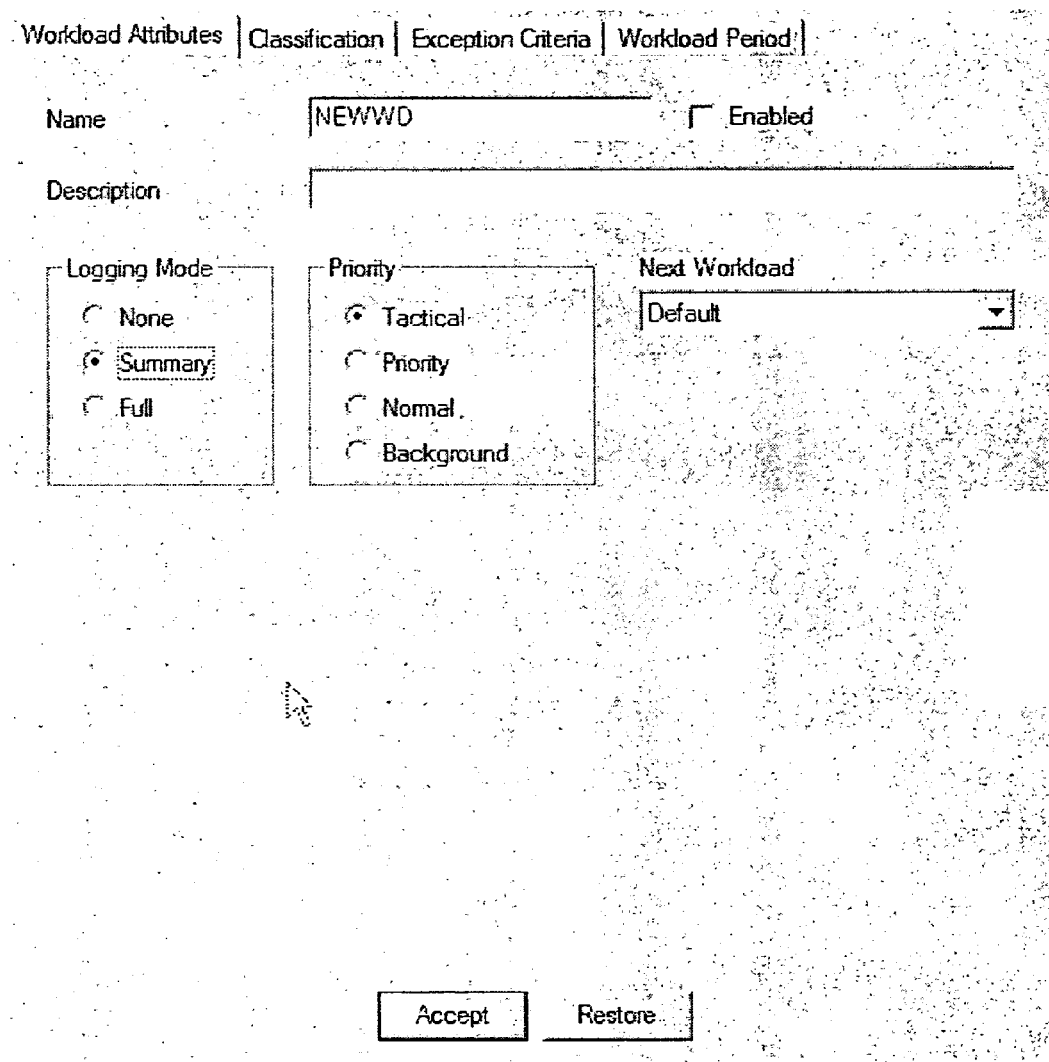

A workload definition multi-tab property sheet is illustrated in FIG. 32. The workload definition property sheet provides tabs for workload attributes, exception criteria, classification, workload period, and summary. Since there can be multiple classifications and multiple periods/actions defined, these tabs allow the user to choose which classification or period/action the user wishes to view from the list box. One of the list box choices will be "new" to create a new classification or period/action.

An example workload attributes tab, shown in FIG. 32, has the following controls:

A text box ("Name") for workload name (for example, 30 characters of text);
A text box ("Description") for description of workload (for example, 80 characters of text);
The following radio buttons for selecting logging mode
None.
Summary—if this radio button is pressed, the logging is indexed by workload definition and reports the average response time, CPU time, I/O time, the number of delayed requests, etc. per workload definition. This is the default value.

Full—if this radio button is selected, the log will contain identification information for each request, the optimizer values used for making decisions, what workload definition the request was placed in, and the resulting runtime values.

Radio buttons for selecting an enforcement priority (tactical, priority, normal or background);

An "Enabled" check box;

A drop-down list ("Next Workload") for choosing the Next Workload definition for exception action;

"Accept" and "Restore" buttons. The Accept button causes any revisions to be accepted.

The Restore button causes default settings to be restored.

In some example systems, the Next Workload value shown on the workload attributes tab is used in the workload period view. This value may be used in the New Workload field when the action is Change Workload. In some example systems, the number of workload definitions is limited, for example, to 35.

Figure 33:
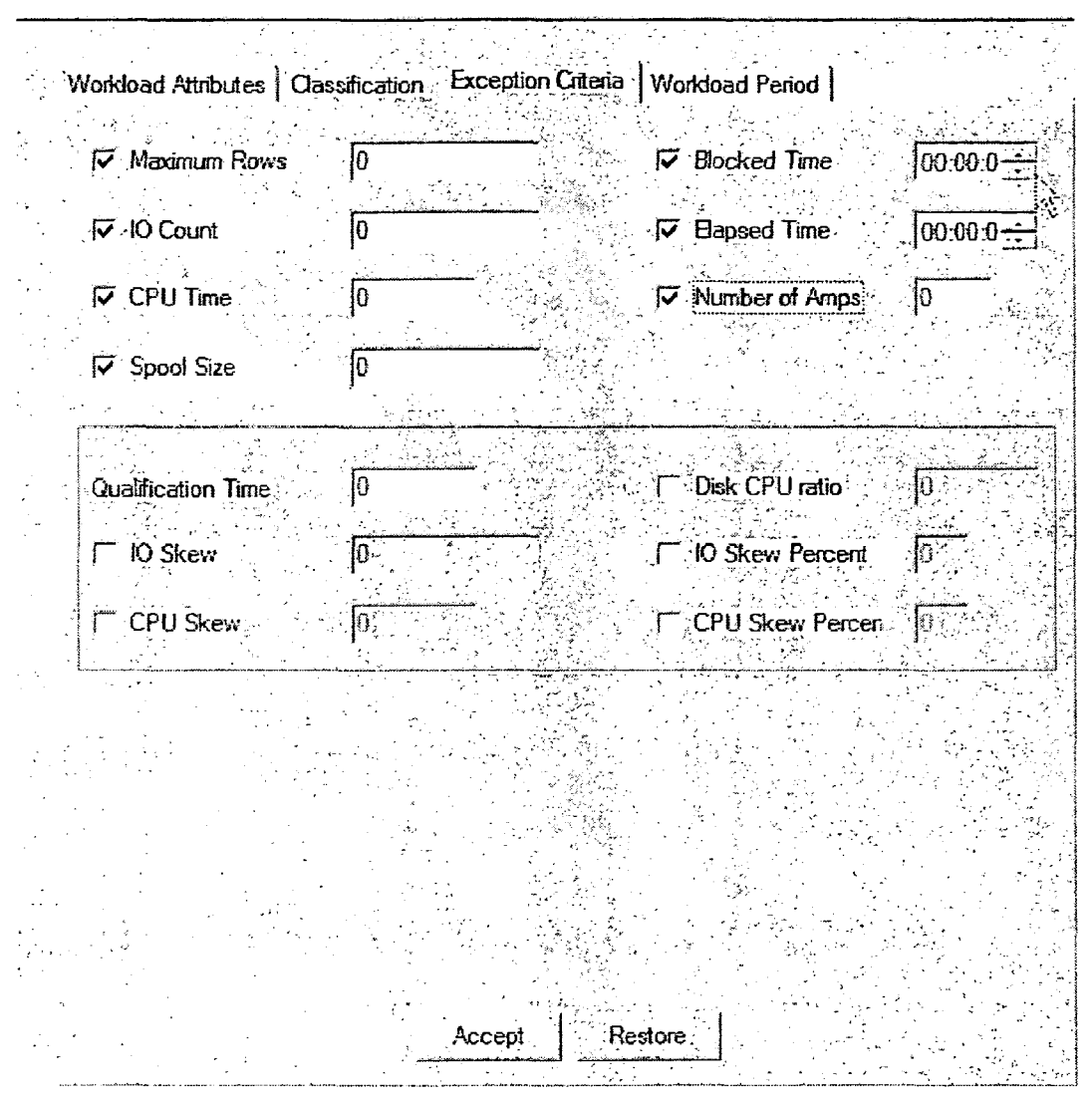

An exception criteria tab, shown in FIG. 33, allows definition of exceptions, which occur when a running request exceeds a limit. An "Accept" button allows revisions to be accepted and a "Restore" button restores defaults. In some example systems, for some of these values, such as skew and disk CPU ratio, the limit must be exceeded for a "qualification time" for an exception to occur. Further, in some example systems, all items with a non-zero value must occur for an exception to be raised. In other words, the items with a non-zero value are ANDed together to determine if an exception should be raised. In other example systems, such as that shown in FIG. 33, the items with filled-in check boxes will be ANDed together to determine if an exception should be raised. If the qualification time is zero, any of the conditions in the box are satisfied as soon as they occur. If the qualification time is non-zero, the exception occurs only if the exception condition persists at least for the duration specified by the qualification time. The exception criteria tab has text boxes that accept a value for each of the following:

MaxRows ("Maximum Rows");
IOCount ("IO Count");
BlockedTime ("Blocked Time");
ResponseTime ("Elapsed Time");
SpoolUsage ("Spool Size");
NumberOfAMPS ("Number of Amps");
CpuTime ("CPU Time");
CpuSkewValue ("CPU Skew");
CpuSkewPercent ("CPU Skew Percent");
IOSkewValue ("IO Skew");
IOSkewPercent ("IO Skew Percent");
DiskCpuRatio ("Disk CPU Ratio"); and
QualifyTime ("Qualification Time").

In some example systems, either blocked time (BlockedTime) or elapsed time (ResponseTime), or both, are selected as conditions, change workload definition is not an allowed exception action. On the periods tab (discussed below with respect to FIG. 36) where exception action is specified, change workload definition will be disabled if there is anything in those two condition fields.

If blocked time and/or elapsed time have values, the user will be notified that change workload definition is not available.

Figure 34:
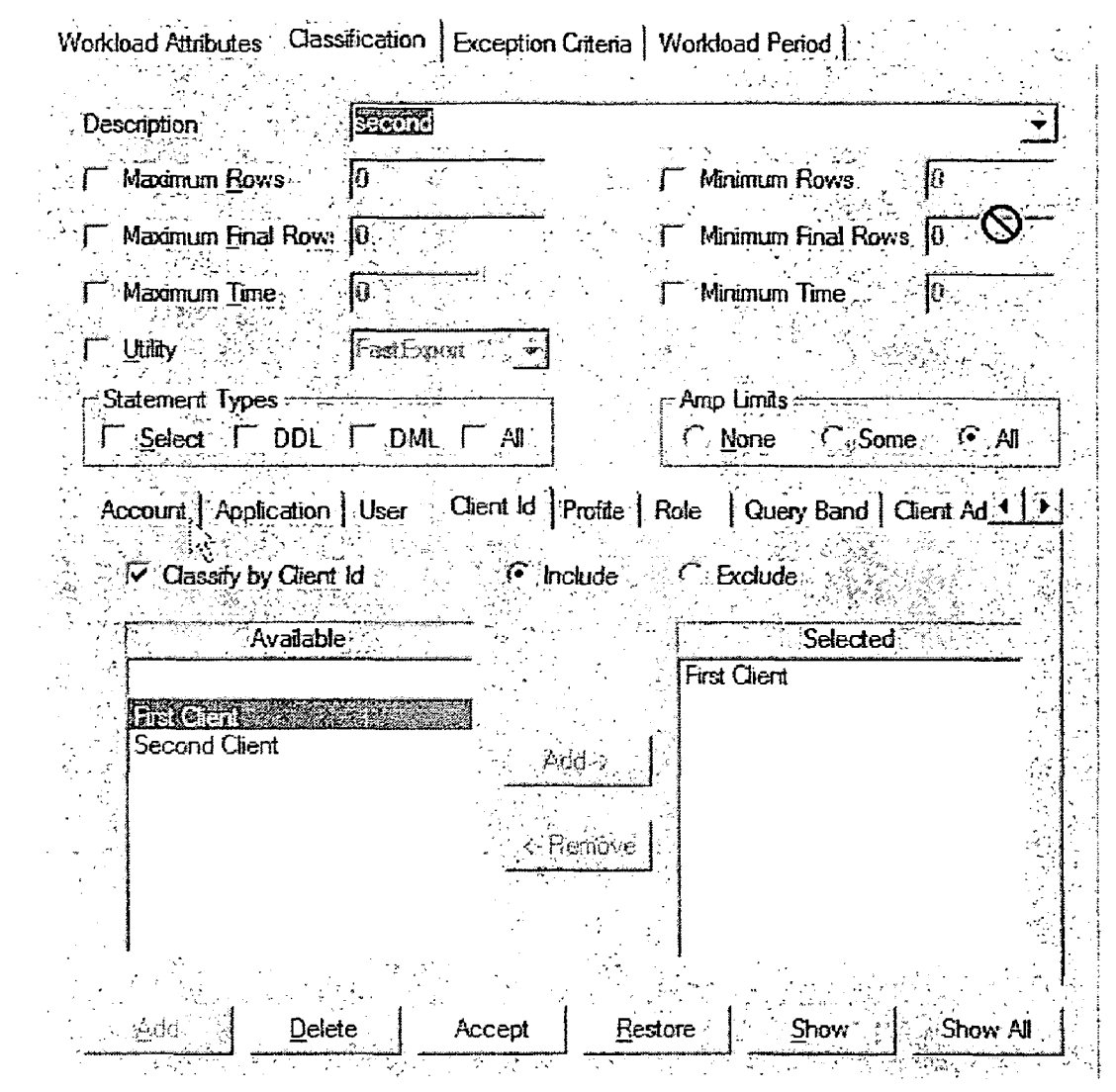

The example workload classification tab, illustrated in FIG. 34, has the following controls:

Text boxes and check boxes for minimum and maximum rows;

Text boxes and check boxes for minimum and maximum final rows;

Text boxes and check boxes for minimum and maximum time;

Radio buttons for AMP limits: none, some, all;

Radio buttons for statement types (Select, DDL, DML, and All). In some example systems, statement type and row, time and amp limits are mutually exclusive;

Tabs for Account, Application, User, Client Id, Profile, Role, Query Band, Client Address (i.e. IP address), and Database Objects (i.e. databases, tables, views, and macros). The Client Id tab, which is shown in FIG. 34, is illustrative of all of the other tabs. It contains a "Classify by Client Id" checkbox, which, if checked, means that Client Id will be a basis for classification. It includes an "Available" box, which lists the Clients that are available for selection, and a "Selected" box, which lists the clients that have been selected. Clients are moved from the Available box to the Selected box by highlighting the client in the Available box and pressing the Add button between the Available and Selected boxes. Clients are moved from the Selected box to the Available box by highlighting the client in the Selected box and pressing the Remove button between the Available and Selected boxes. The Client Id tab also includes radio buttons for "include" and "exclude." Activating the "include" radio button will cause the classification to include the selected clients. Activating the "exclude" radio button will cause the classification to exclude the selected clients.

Add, Delete, Accept, Restore, Show and Show All buttons. The Add button adds a new classification. The Delete button deletes the classification named in the Description field.

The Accept button accepts any changes made to the displayed classification. The Restore button restores the defaults for the classification. The Show button produces a pop-up window with a textual description of the classification. The Show All button produces a pop-up window with textual descriptions for all classifications.

These controls, and those shown on other screens, such as those shown in FIG. 29, constitute business concepts. By manipulating the controls, the DBA maps business concepts to TDWM features, including workload definitions. Such a mapping provides the DBA a direct correlation between his or her business goals and the configuration of the system. If the DBA, as a business matter, decides to enhance one type of performance at the expense of another, these controls provide the capability to do so.

Figure 35:
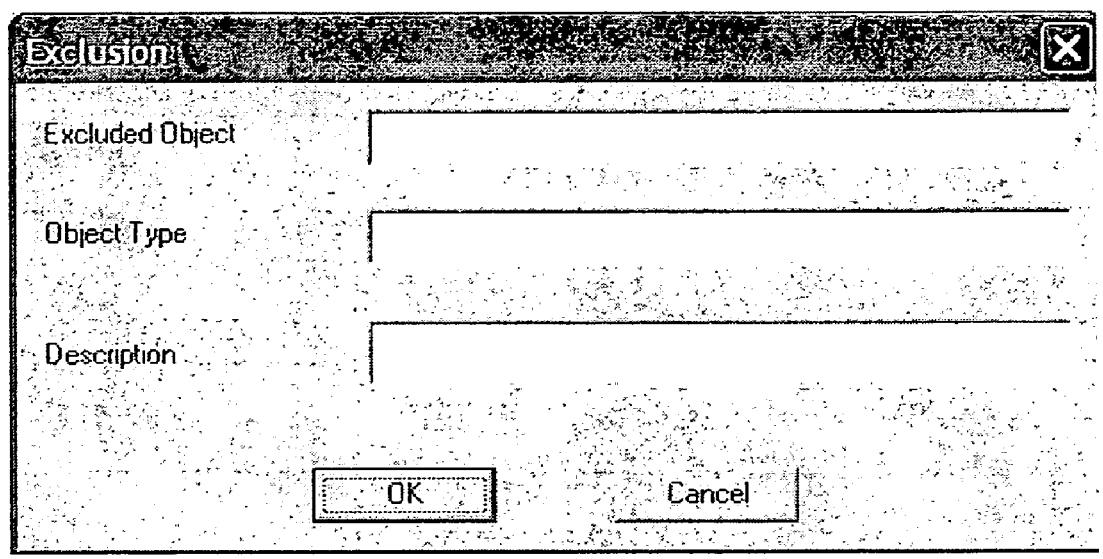

An example exception criteria tab, illustrated in FIG. 35, provides a text box for the user to enter an excluded object, which can be a user, database, view, etc., which may be chosen from the database browser or entered by the user. An object type field is also provided. If the object name is typed by the user, the user must provide an object type. If drag/drop is used to select an object from the database browser, the type will be inferred. A text box 3605 is also provided for a description. The description will appear if a tree view is selected.

Figure 36:
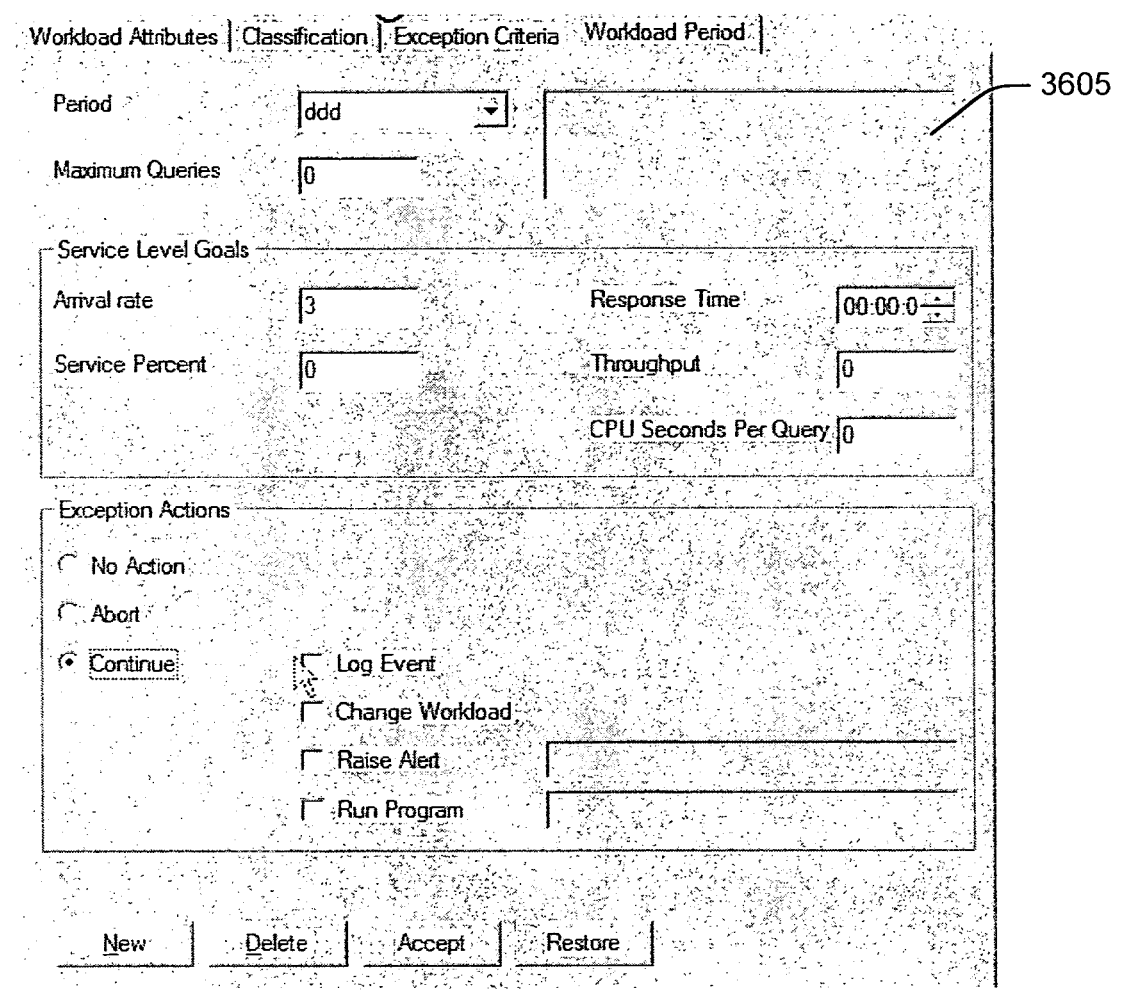

An example workload period tab, illustrated in FIG. 36, will have the following controls:

A drop-down list with all existing periods. The user will select a period from the period drop-down list that will include the entry "new." If the user selects "new," a dialog will appear for the user to define a new period. The new period will then appear in the tree view. A multi-line read only edit box will display a description of the period selected.

Text boxes for service level goal parameters including:
  Arrival rates;
  Response Time (time value);
  Throughput;
  Service Percent; and
  CPU Seconds per Query.
A text box for the maximum number of queries that can be executing within the workload definition at any given time. In some example systems, zero means no limit.

The example workload period tab provides an Exception Actions area which defines the processing options for exceptions. The processing options will be selected by radio buttons and check boxes. The radio buttons include:
  No Action;
  Abort; and
  Continue.
Under the continue radio button, the following selections may be made:
  "Log event" which causes the system to save information about the exception;
  "Change Workload" which causes the system to run the request under new workload definition. In some example systems, a text box (not shown) is provided to allow entry of the new workload definition name.
  "Raise Alert," with a text box to enter the logical action name for the alert
  "Run Program" with a text box to enter the program name.
In the example shown, more than one continue action may be specified.

In the example workload period tab, the three radio buttons, (No Action, Abort, and Continue) are mutually exclusive. If Continue is chosen, at least one of the check boxes must be checked. By default, when Continue is chosen, Log Event will be checked.

In the example shown, text boxes for Run Program and Raise Alert will accept text strings.

The example shown includes the following buttons at the bottom of the page: New, Delete, Accept and Restore. The New button establishes a new workload period. The Delete button deletes the displayed workload period. The Accept button accepts changes that have been made to the displayed workload period. The Restore button restores the values to their defaults for the displayed period.

A set of summary tabs, illustrated in FIG. 37, provides the DBA with summary information for all periods the DBA has defined for a workload definition. The example in FIG. 37 shows the Allocation Group tab. The other summary tabs include a Period Name tab, a Date/Time tab and a resource partition tab.

The TDWM Administrator will provide a property sheet wizard that will step the user through the screens needed to completely specify a WD. These screens will be shown in the following order:
  Workload Attributes, FIG. 32;
  Workload Classification, FIG. 34;
  Workload Exceptions, FIG. 33;
  Workload Period, FIG. 36.

When the user creates a new workload definition, the administrator 405 will create a blank workload classification (with no exclusions), a workload period that references the default period that has no exception criteria and no exception actions defined.

Figure 38:
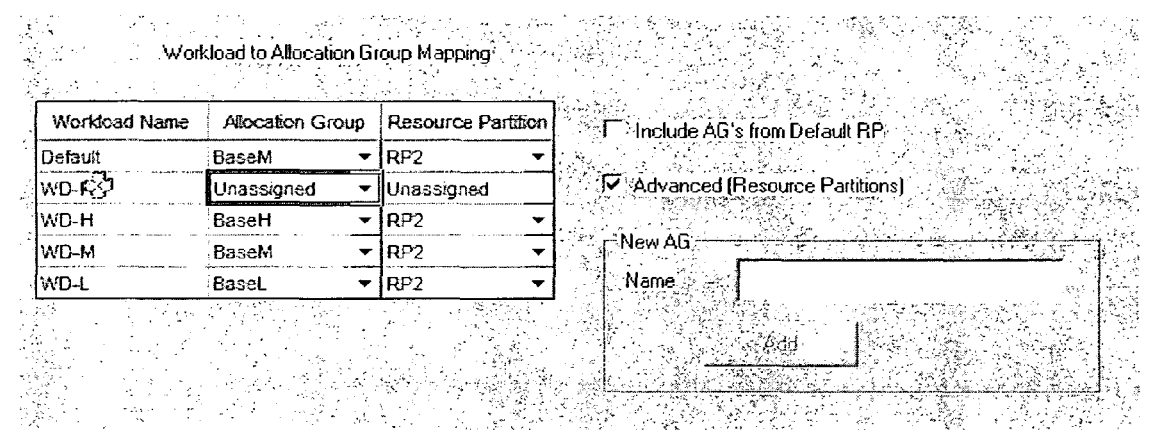

An example workload definition to allocation group mapping screen, illustrated in FIG. 38, provides the ability to map workload definitions to allocation groups. The screen includes a multi-column workload definition to allocation group mapping grid. The left-most column of the grid includes the workload definition names. The center column includes list boxes to choose allocation groups. The rightmost column, which is only displayed when the Advanced (Resource Partitions) checkbox is filled in, displays the resource partition to which the workload definition is assigned.

In some example systems, when an allocation group is first mapped to a workload definition, the enforcement priority associated with the workload definition is associated with the allocation group.

In some example systems, resource partition 1 (RP1) is reserved for workload definitions with tactical enforcement priority. The Administrator assures that only allocation groups mapped to workload definitions with tactical enforcement priority are placed in RP1.

The allocation group column has dropdown lists of allocation groups that can be associated with each workload definition. Only allocation groups with the appropriate enforcement priority are displayed (including allocation groups that have not yet been mapped). An "unassigned" list entry will be included and selected by default until the user chooses an allocation group.

In some example systems, a check box to "Include Default AGs" is included in the drop-down list. These are the allocation groups associated with the R, H, M and L PGs in RP0.

The spreadsheet may be sorted on any column. Further, the spreadsheet may be sorted on multiple columns, i.e. by resource partition, then by allocation group, then by workload definition.

The user adds an allocation group by entering a name in the New AG name box. The Add button will be enabled when text appears in the box. When the user clicks the Add button, the allocation group is added to the grid. Allocation group numbers are assigned by the administrator 405.

Allocation groups are not directly deleted. Allocation groups that have no workload definitions referring to them are not written to the TDWM tables by the administrator 405 when a workload definition set is saved.

Operations

Examples of the basic functions that can be executed by the DBA are now described. For each function, the internal steps that Administrator will take are listed.

In some example systems, only one DBA will be able to modify the TDWM database at a time. While one DBA is modifying it, others may inspect it in read-only mode.

Enable Workload Management
When the DBA enables workload management, the administrator 405 performs the following functions:
  Check that TDWM tables have been created and initialized;
  Read the TDWM configuration;
  Read the TDWM PSF template from the DBMS;
  Verify that the WD configuration is valid;
  Verify that the PSF configuration is valid; and
  Send a TDWM ENABLE command via PM/API.

Update Workload Management
When the DBA initiates an update to workload management, the administrator 405 performs the following functions:
  Verify that the WD configuration is valid;
  Verify that the PSF configuration is valid;
  Verify that Removed fields of appropriate tables are NULL if a row is still active or set to date/time if deleted;
  Create new row(s) and update existing row(s) in tables containing the Workload information;
  Update a table keeping track of; and
  Enable the TDWM.

Disable Workload Management

When the DBA disables workload management, the administrator 405 performs the following functions:

Send TDWM DISABLE command via PM/API. (In the DBMS, the previously retained states of Category 1 & 2 TDWM and PSF are restored).

PSF Configuration and Settings

The Administrator will create a PSF template for the DBMS. When TDWM is enabled or updated, the DBMS reads the TDWM PSF tables and completes the PSF definition, based on the template specification.

The DBMS analyzes the usage of PGs and AGs and maps virtual PG and AG assignments made by the TDWM Administrator to actual PGs and AGs.

Any time the TDWM workload definitions settings are updated in the DBMS, the PSF template settings are also be updated.

Workload Definition Operations

Create a WD

A user creates a new workload by selecting workload definition in the tree (FIG. 27), right clicking and choosing "New" from the pop-up menu. The following functions are then performed:

User fills in data in each detail screen;
Create WD on WD form; add WD attributes (FIG. 32);
Create WD classifications on classification form (FIG. 34);
Create or assign one or more WD periods on period form (FIG. 36);
Assign priority scheduler parameters; and
As each form is completed the administrator 405 will verify correctness.

Modify a WD

When the DBA selects a WD or WD subcomponent in the tree browser (FIG. 27), the appropriate view displays the current settings. The following functions are then performed:

DBA makes modifications to detail screen;
If the DBA clicks Accept Changes, the changes are saved in the internal representation of the WD;
If the DBA clicks Cancel, or selects another tree node, the previous settings are restored; and
Changed fields are saved for later update.

Enable/Disable a WD

When the DBA disables a WD the following functions are performed:

User selects WD or WD subcomponent in tree browser (FIG. 27); and
User chooses Enable or Disable.

Delete a WD

When the DBA disables a WD the following functions are performed:

User marks WD in tree browser (FIG. 27);
User chooses Delete; and
WD will have the removed field set to date/time when TDWM is updated.

Period Exception Criteria, Exception Action

When the DBA wishes to create or modify a classification, period, exception criteria, or exception action for a WD the following functions are performed:

When the user selects an existing item, it is displayed for update;
When the user selects <New> item, a blank version is displayed for update with fields set to defaults where appropriate;
The DBA makes changes;
If the DBA clicks Accept Changes, the changes are saved in the internal representation of the item;
If the DBA clicks Cancel, or selects another tree node, the previous settings are restored and the new item is deleted; and
Changed fields are saved for later Update.

Utility Mapping Table

Instances of Fastload, Multiload and, FastExport are subject to TDWM control. The utilities are identified through logon partition.

Teradata load utilities are controlled through TDWM as a workload limitation. There is a limitation on the number of load utility requests allowed in the system at one time. WDs for Load Utilities can be created in the Administrator. If utility concurrency limits are exceeded, the incoming utility is rejected. The following functions are performed:

User chooses Modify Utility Mapping;
User makes modifications to utility mapping screen; and
Changed fields are saved for later Update.

Utility Rules

When the DBA wishes to create or modify utility rules the following functions are performed:

The user chooses Utility WD or subcomponent in tree browser (FIG. 27);
The user makes modifications to utility detail screen; and
Changed fields are saved for later Update.

Deadlock Settings

When the DBA wishes to create or modify deadlock settings the following functions are performed:

The user chooses Modify Settings;
The user selects the desired deadlock detection settings and time periods (not to be confused with "Deadlock Timeout" in the DBMS Control record); and
The administrator 405 sends the TDWM a command to inform the DBMS of the new settings.

Console Utilities

For the purpose of managing Console Utilities and other functions, the DBMS needs to have a mapping of PGs to WDs. The administrator 405 will provide the capability to map existing PGs to WDs. A table will be defined in the TDWM database to maintain these mappings.

The administrator 405 will create four WDs that are mapped to the L, M, H, and R PGs. In some example systems, the DBA can create up to 35 additional WDs.

The administrator 405 maps each console utility to a WD. A table is defined in the TDWM database to maintain these mappings.

Performance Group to Workload Mapping

The administrator 405 will get a list of defined PGs from the PSF. For each PG, there will be a drop-down list for the DBA to choose the associated WD. In one example system, the mappings for the R, H, M and L PG's are fixed:

Performance Group R maps to Workload Definition WD-R;
Performance Group H maps to Workload Definition WD-H;
Performance Group M maps to Workload Definition WD-M;
Performance Group L maps to Workload Definition WD-L.

In some example systems the mapping between PGs and WDs is automatic.

Console Utility to Workload Mapping

For some example systems, the list of Console Utilities is fixed and includes:

CheckTable;
Configuration/Reconfiguration;
Ferret;

Query Configuration;
Query Session;
Recovery Manager;
Table Rebuild;
Filer; and
Replication Services.

For each Console Utility, there will be a drop-down list for the DBA to choose the associated WD.

File and Other Operations

Get Profiler Recommendations for a WD
One possible set of functions involved in getting profiler recommendations for a workload definition includes:
User marks WD in tree browser;
User chooses Get Classification Recommendations;
User selects classification parameters to analyze;
WD name and classification parameters are sent to Profiler;
The profiler 515 analyzes data and returns recommendation;
The administrator 405 displays recommendation to user;
User approves or disapproves recommendation; and
The administrator 405 applies the recommendation (see Modify).

Save a WD to a File
When saving a workload definition to a file, the following functions are performed:
The user marks one or more WD's in the tree browser;
The user chooses Save; and
The administrator serializes the selected WD(s) and settings to a file.

Read a WD from a File
When reading a workload definition from a file, the following functions are performed:
The user chooses Open;
The user selects file; and
The administrator 405 deserializes WD(s) from the file and inserts it (them) into tree browser.

Save WDSet to a File
When saving a set of workload definitions, which may be all workload definitions, to a file, the following functions are performed:
The user chooses Save All; and
The administrator 405 serializes all WDs and their settings into a file.

Read a WDSet from a File
When reading a set of workload definitions from a file, the following functions are performed:
The user chooses Open;
The administrator checks to see if current values have been changed and, if so, prompts to save;
The user selects a file; and
The administrator 405 removes existing WDs from the tree and adds the new WDs.

Priority Scheduler Interface

In some example systems, the administrator 405 will provide the DBA the ability to specify Priority Scheduler Facility parameters. The administrator will provide a simplified interface to define the key parameters for PSF. The administrator will write these specifications to tables in the TDWM database for the DBMS to use when TDWM is enabled.

The process of defining WDs is asynchronous with the enabling of TDWM. Consequently, the administrator 405 may not know which RPs, PGs and AGs are available at any particular time. Instead of specifying actual PSF objects, the DBA will specify virtual PSF objects. Then, when TDWM is enabled, the DBMS will select actual PSF objects based on the existing PSF environment at that time. This frees both the administrator 405 and DBMS from trying to maintain disjoint sets of PSF objects.

The mapping of WDs to PGs is one to one, Consequently, there is no need to do the mapping in the administrator 405. This mapping will be done in the DBMS when TDWM is enabled.

The DBA will have the capability of specifying these aspects of PSF:
For each WD, the Resource Partition and Allocation Group in that RP;
Resource Partitions (other than the Default RP) and RP weights; and
Allocation Groups and AG weights.

In one example system, each WD will use its own PG. Each PG will belong to a single WD. When TDWM is enabled, the DBMS will assign actual PG numbers to WDs. Users will not be able to adjust PSF settings via either schmon command or PSA to avoid conflicts. Internal interfaces will change PSF settings.

Basic system PGs ($R, $H, $M, $L) will remain for compatibility when TDWM is disabled and the system reverts back to using account string priorities.

The administrator 405 will have an algorithm to calculate all PSF weights and other parameters. The DBA will have the ability to review and override them.

Figure 39:
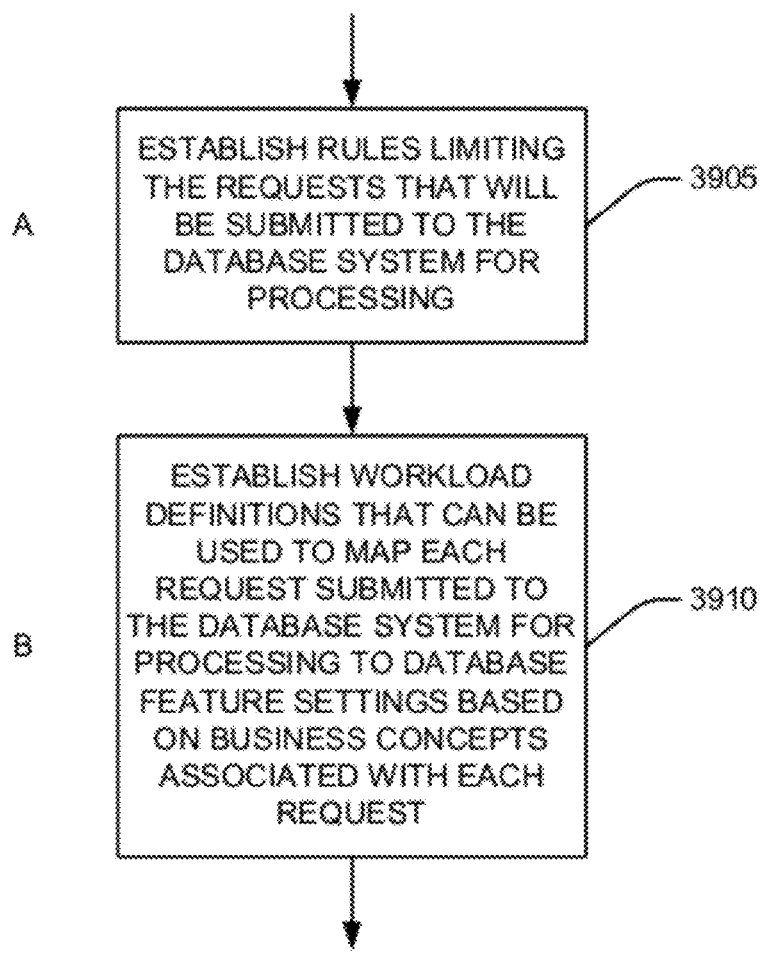

Flowcharts describing an example of the operation of the administrator will now be described. In operation, as illustrated in FIG. 39, the administrator 405 establishes rules, such as those shown in FIG. 24, limiting the requests that will be submitted to the database system for processing (block 3905). The administrator then establishes workload definitions, again such as those shown in FIG. 24, that can be used to map each request submitted to the database system for processing to database feature settings based on business concepts associated with each request (block 3910).

Figure 40:
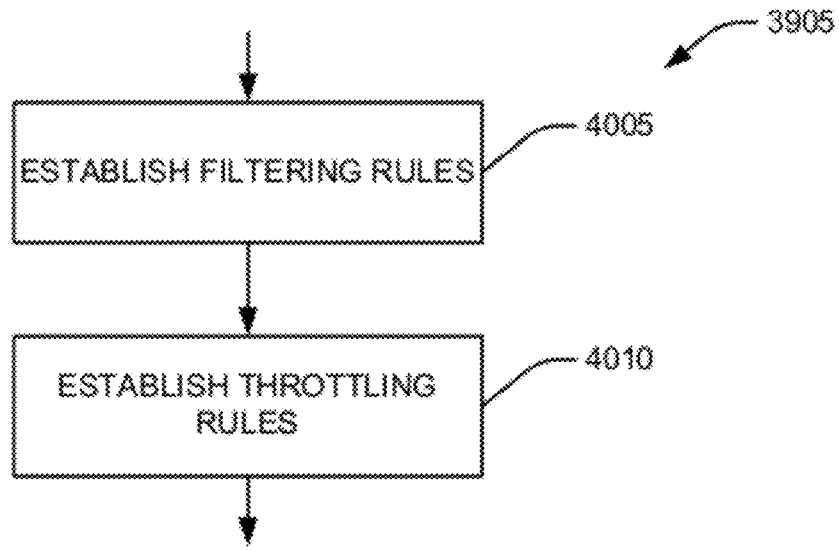

The example process for establishing rules limiting the requests that will be submitted to the database for processing (block 3905), as illustrated in further detail in FIG. 40, includes establishing filtering rules (block 4005) and establishing throttling rules (block 4010). See the discussion regarding FIG. 25.

Figure 41:
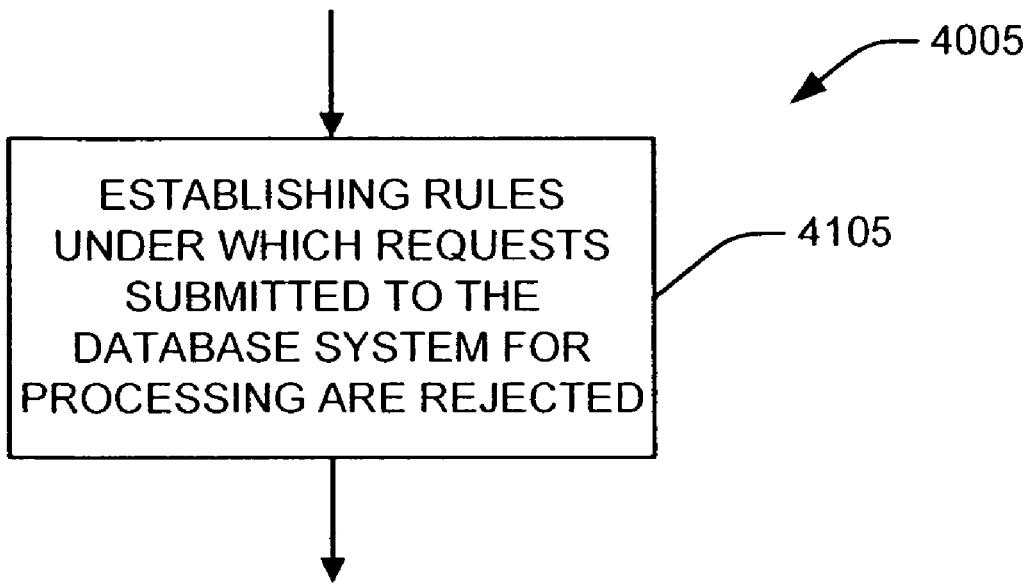

The example process for establishing filtering rules (block 4005), as illustrated in greater detail in FIG. 41, includes establishing rules under which requests submitted to the database system for processing are rejected (block 4105).

Figure 42:
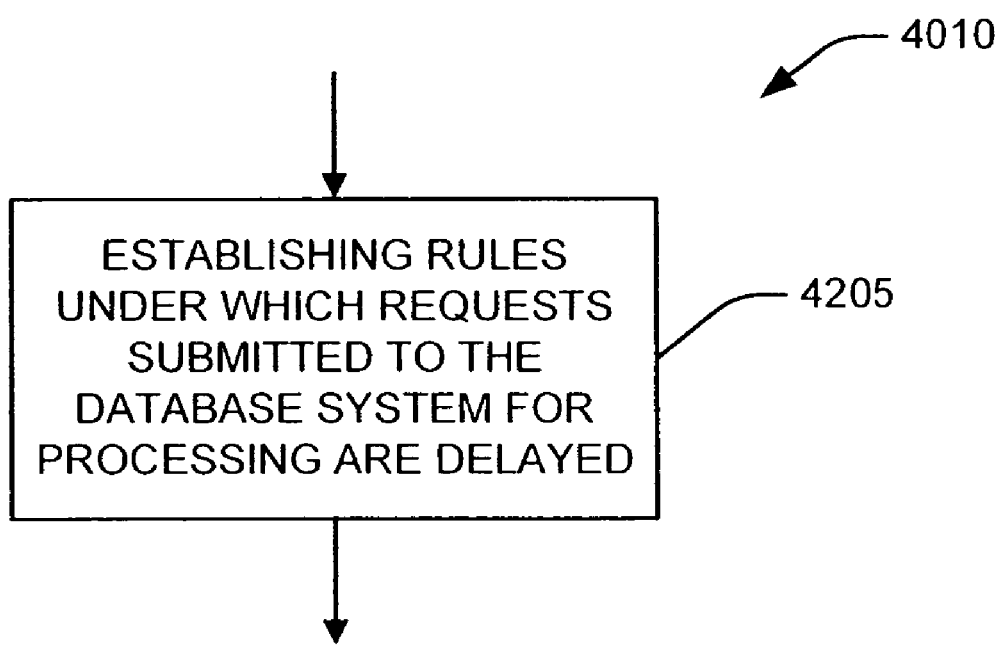

The example process for establishing throttling rules (block 4010), as illustrated in greater detail in FIG. 42, includes establishing rules under which requests submitted to the database system for processing are delayed (block 4205).

Figure 43:
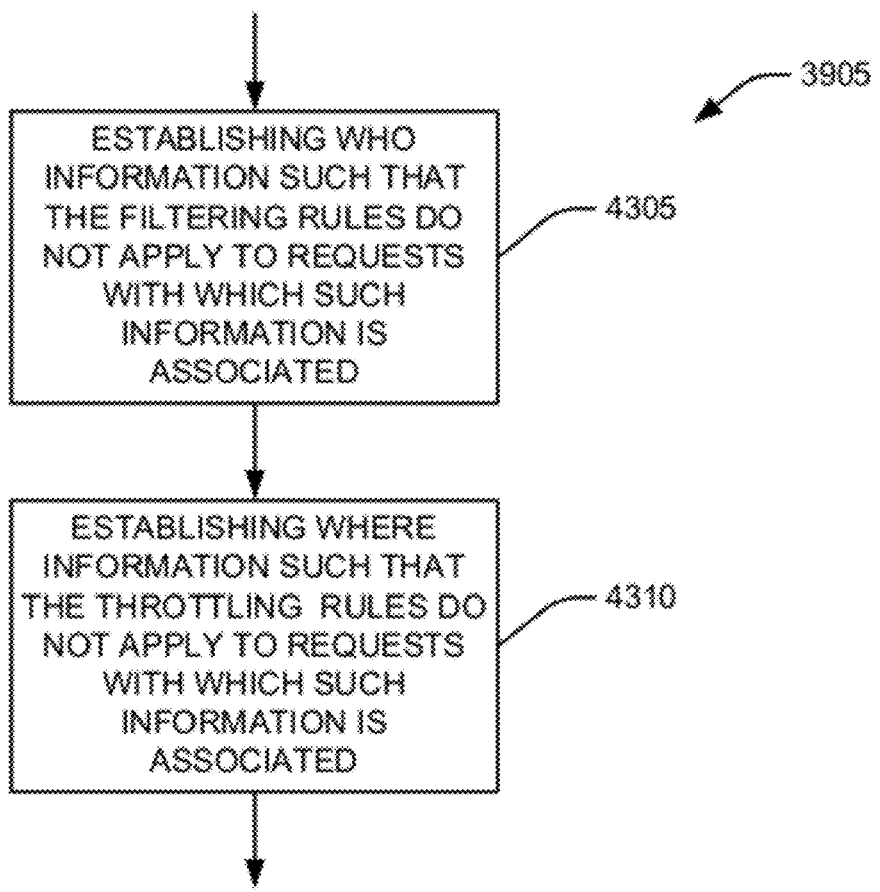

The example process for establishing rules limiting the requests that will be submitted to the database system for processing (block 3905), illustrated in greater detail in FIG. 43, also include establishing "who" information, such as that shown in FIG. 26, such that the filtering rules do not apply to requests with which such information is associated (block 4305) and establishing "where" information, such as that shown in FIG. 26, such that the throttling rules do not apply to requests with which such information is associated (block 4310).

Figure 44:
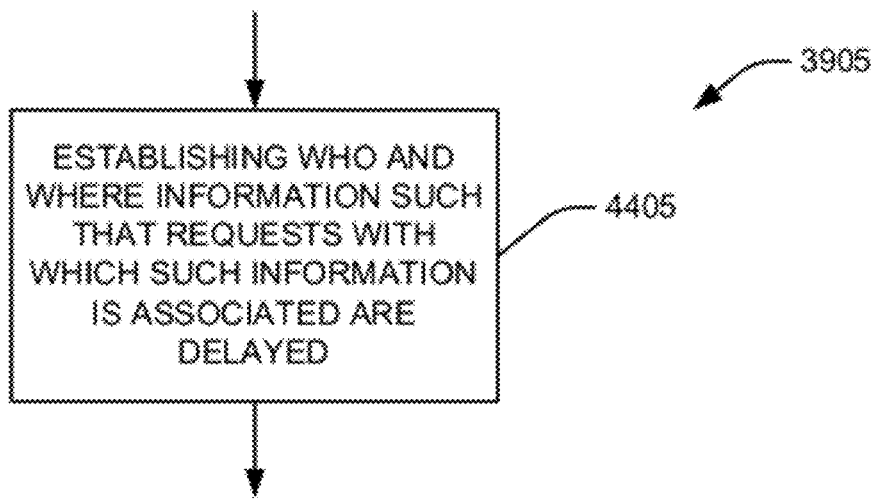

The example process for establishing rules limiting the requests that will be submitted to the database system for processing (block 3905) may also include establishing "who" and "where" information, such as that shown in FIG. 26, such that requests with which such information is associated are delayed (block 4405), as illustrated in FIG. 44.

Figure 45:
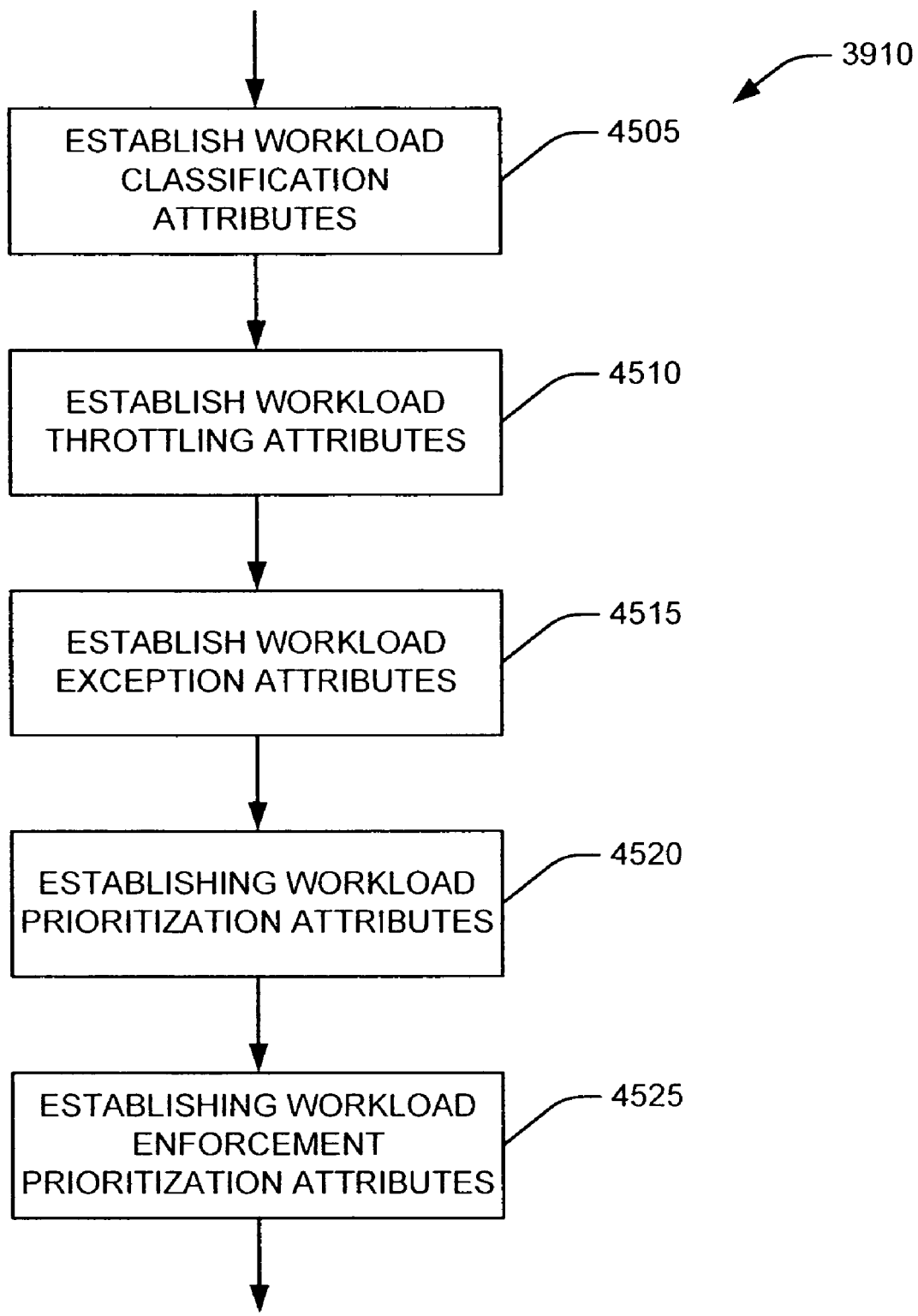

The process for establishing workload definitions (block 3910), as further illustrated in FIG. 45, includes establishing workload classification attributes (block 4505), using the screen shown in FIG. 34. Workload throttling attributes are established (block 4510), using the screen shown in FIG. 32. Workload exception attributes are established (block 4415), using the screens shown in FIGS. 33 and 36. Workload prioritization attributes are established (block 4520), using the screen shown in FIGS. 29-31. Workload enforcement prioritization attributes are established (block 4525), using the screen shown in FIG. 32.

The process of establishing workload classification attributes (block 4505), as further illustrated in FIG. 46, includes for each workload definition, identifying one or more business concepts, such as those shown in FIG. 34, associated with requests that will identify requests to be classified to that workload (block 4605).

The process of establishing workload throttling attributes (block 4510), as further illustrated in FIG. 47, includes for each workload definition, identifying one or more attributes of requests classified to that workload that determine if such requests are rejected, throttled, or run with special privileges (block 4705).

Figure 48:
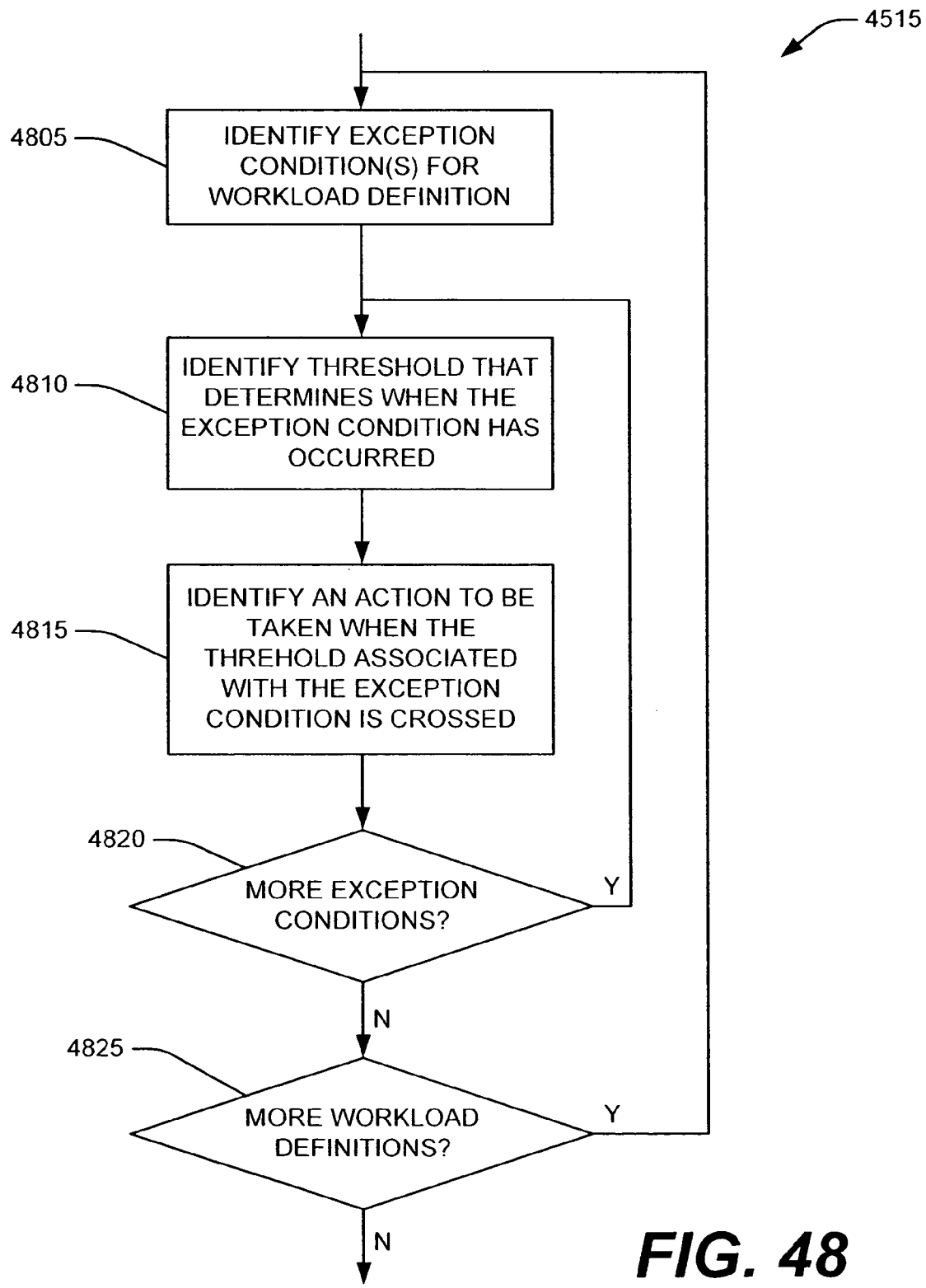

The process of establishing workload exception attributes (block 4515), as further illustrated in FIG. 48, includes identifying exception conditions, such as those shown in FIG. 33, for a selected workload definition (block 4805). The threshold that determines when the exception condition has occurred is identified (block 4810). An action to be taken when the threshold associated with the exception condition is crossed, such as those illustrated in FIG. 36, is identified (block 4815). If there are more exception conditions (block 4820), blocks 4810 and 4815 are repeated. If there are more workload definitions (block 4825), blocks 4805, 4810 and 4815 are repeated.

Figure 49:
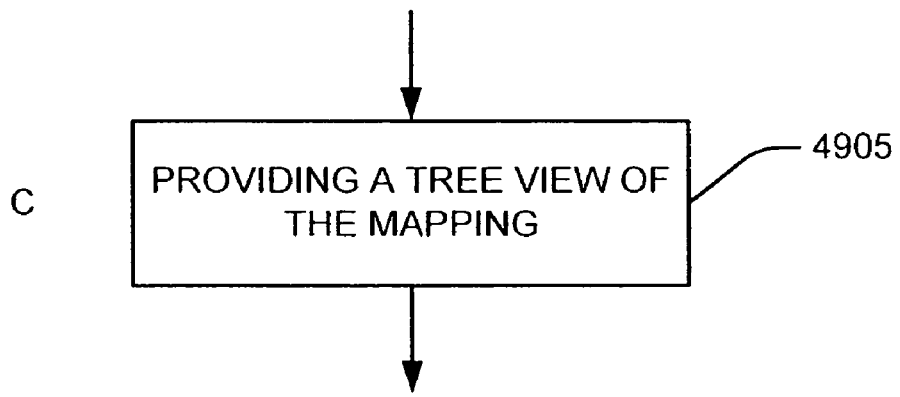
Figure 50:
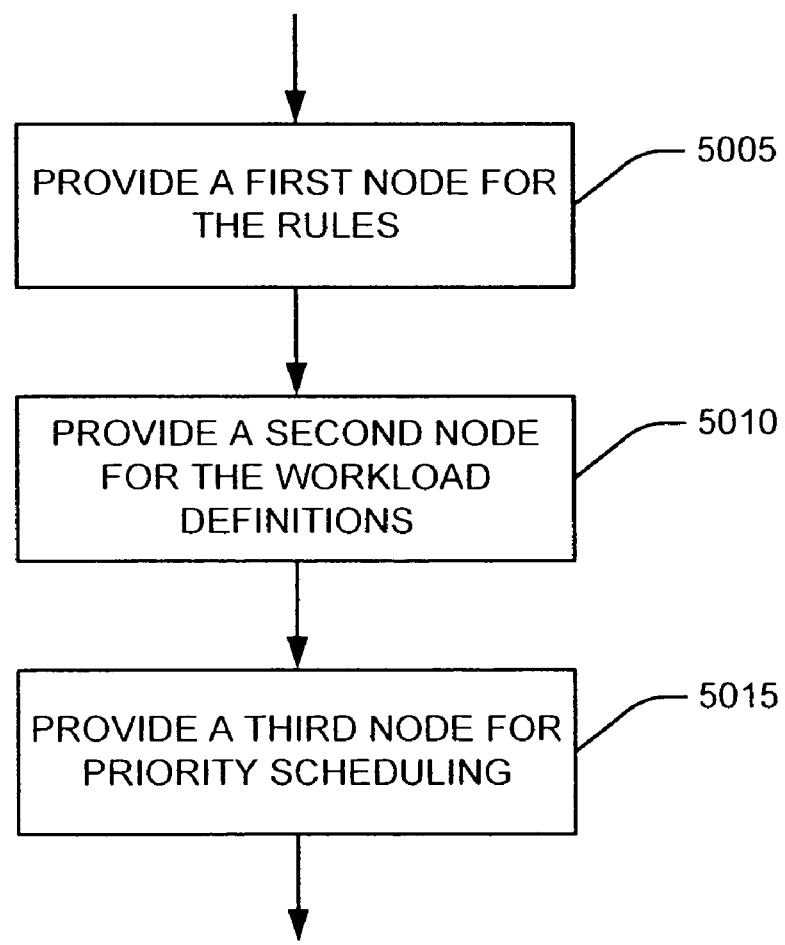

The administrator 405 process, illustrated in FIG. 39, also includes providing a tree view, such as that shown in FIG. 27. of the mapping (block 4905), as illustrated in FIG. 49. This process, further illustrated in FIG. 50, includes providing a first node for the rules (block 5005). A second node for the workload definitions is provided (block 5010). A third node for priority scheduling is also provided (block 5015).

Figure 51:
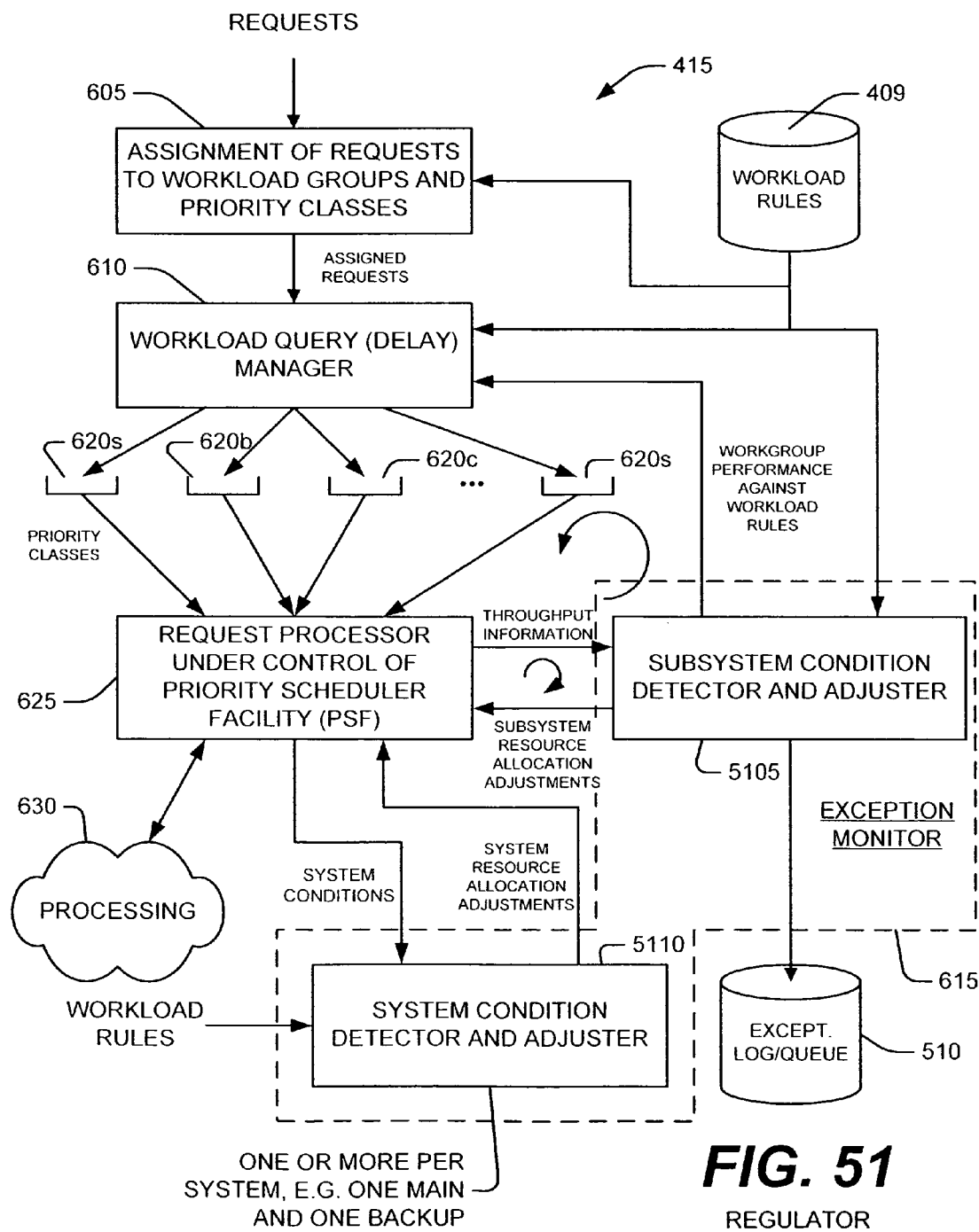
FIG. 51 is a regulator flow chart.
Figure 52:
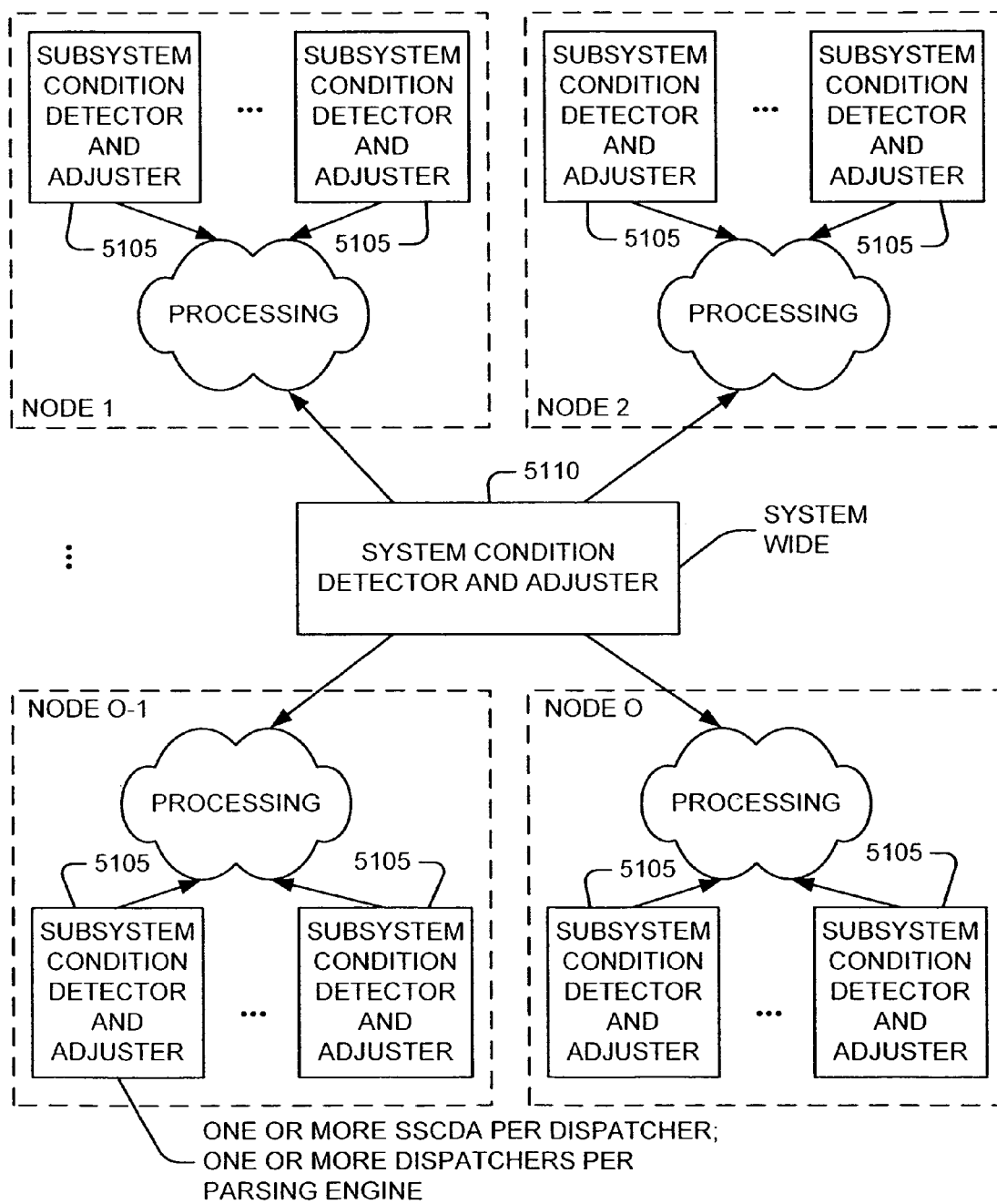
FIG. 52 shows the relationship between the system condition detector and adjustor and the subsystem condition detector and adjustors.

The exception monitor 615 of the regulator 415, shown in more detail in FIG. 51, includes a subsystem condition detector and adjuster (SSCDA) 5105 and a system condition detector and adjuster (SCDA) 5110. As shown in FIG. 52, in one example system there is one SCDA 5110 for the entire system. In some example systems, one or more backup SCDAs (not shown) are also provided that will operate in the event that SCDA 5110 malfunctions.

There is one SSCDA 5105 per dispatcher, as shown in FIG. 52. This is not a limitation, because, as indicated in FIG. 52, some example systems may have more than one SSCDA 5105 per dispatcher. In addition, some example systems have only one dispatcher per parsing engine, although this is not a limitation of the concept described herein. Further, in some example systems each parsing engine may run on a single node or across multiple nodes. In some example systems, each node will include a single parsing engine. Thus, for example, there may be one SSCDA per AMP, one per parsing engine, or one per node.

Returning to FIG. 51, the SCDA monitors and controls resource consumption at the system level, while the SSCDA monitors and controls resource consumption at the subsystem level, where in some example systems, a subsystem corresponds with a single dispatcher. As mentioned above, some subsystems may correspond to a share of a dispatcher. Further, a subsystem may correspond to more than one dispatcher.

Each SSCDA monitors and controls, in a closed loop fashion, resource consumption associated with a single subsystem. An SSCDA monitors throughput information that it receives from the request processor 625 and compares that performance information to the workload rules 409. The SSCDA then adjusts the resource allocation in the request processor 625 to better meet the workload rules.

The SCDA receives system conditions, compares the conditions to the workload rules, and adjusts the system resource allocations to better meet the system conditions. For convenience, FIG. 51 shows the SCDA receiving inputs from and sending outputs to the request processor 625. In another example system, the inputs and outputs to and from the SCDA are handled as described below with respect to FIG. 53.

Generally, the SSCDA provides real-time closed-loop control over subsystem resource allocation with the loop having a fairly broad bandwidth, for example on the order of a millisecond$^{-1}$. The SCDA provides real-time closed-loop control over system resource allocation with the loop having a narrower bandwidth, for example on the order of a second$^{-1}$.

Further, while the SSCDA controls subsystem resources and the SCDA controls system resources, in many cases subsystem resources and system resources are the same. The SCDA has a higher level view of the state of resource allocation because it is aware, at some level as discussed with respect to FIG. 53, of the state of resource allocation of all subsystems, while each SSCDA is generally only aware of the state of its own resource allocation. A system may include some resources that are shared at a system level. Such resources would be truly system resources controlled by the SCDA.

The system conditions include:

Memory—the amount of system and subsystem memory currently being used. It is possible that the system will include some memory that is shared among all of the subsystems.

AMP worker tasks (AWT)—the number of available AWTs. An AWT is a thread or task within an AMP for performing the work assigned by a dispatcher. Each AMP has a predetermined number of AWTs in a pool available for processing. When a task is assigned to an AMP, one or more AWTs are assigned to complete the task. When the task is complete, the AWTs are released back into the pool. As an AMP is assigned tasks to perform, its available AWTs are reduced. As it completes tasks, its available AWTs are increased.

FSG Cache—the amount of FSG cache that has been consumed. The FSG cache is physical memory that buffers data as it is being sent to or from the data storage facilities.

Arrival Rates—the rate at which requests are arriving. Arrival rate can be broken down and used as a resource management tool at the workload basis.

Co-existence—the co-existence of multiple types of hardware.

Skew—the degree to which data (and therefore processing) is concentrated in one or more AMPs as compared to the other AMPs.

Blocking (Locking)—the degree to which data access are blocked or locked because other processes are accessing data.

Spool—the degree of consumption of disk space allocated to temporary storage.

CPU—the number of instructions used per second.

I/O—the datablock I/O transfer rate.

Bynet latency—the amount of time necessary for a broadcast message to reach its destination.

Figure 53:
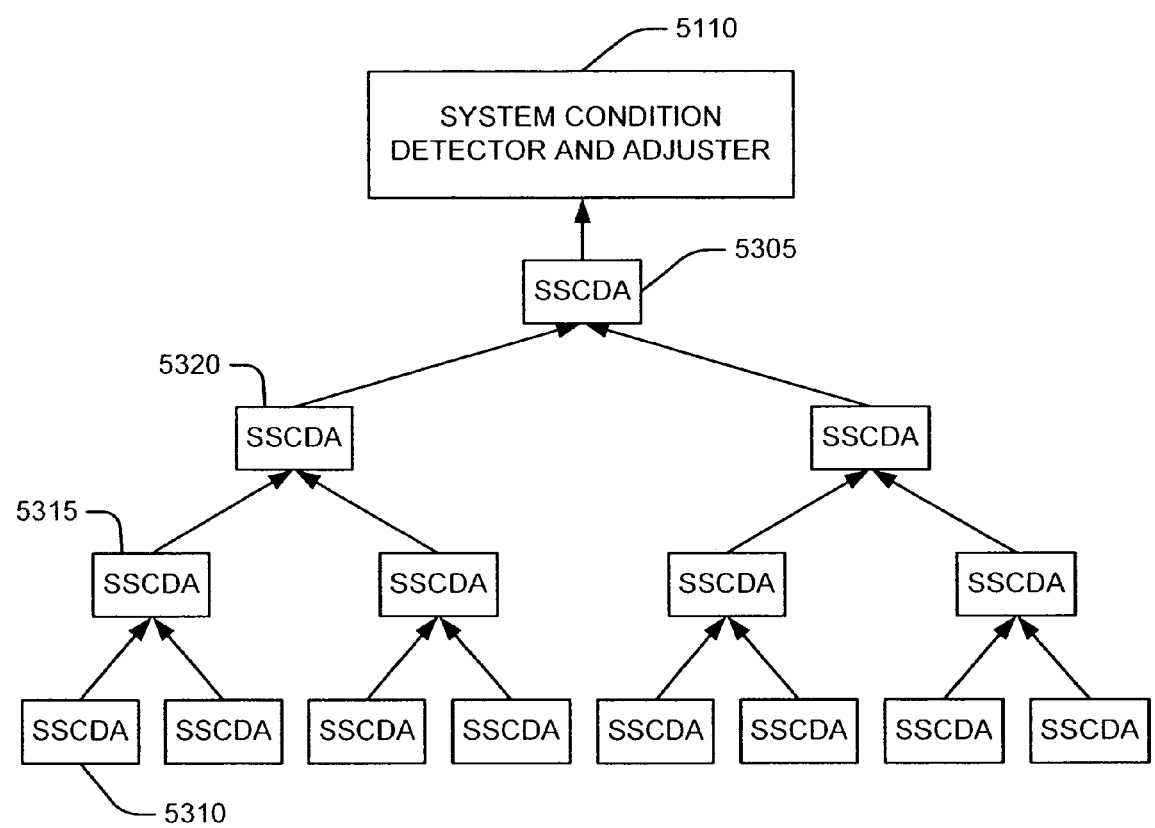
FIG. 53 illustrates how subsystem and system condition information flows through the system to the system condition detector and adjuster.

One example of the way that the SCDA 5110 may monitor and control system resource allocations is illustrated in FIG. 53. The SSCDAs are arranged in a tree structure, with one SSCDA (the root SSCDA 5305) at the top of the tree, one or more SSCDAs (leaf SSCDAs, e.g. leaf SSCDA 5310) at the bottom of the tree, and one or more intermediate SSCDAs (e.g. intermediate SSCDA 5315) between the root SSCDA and the leaf SSCDAs. Each SSCDA, except the root SSCDA 5305, has a parent SSCDA (i.e. the immediately-higher SSCDA in the tree) and each SSCDA, except the leaf SSCDA, has one or more child SSCDA (i.e. the immediately lower SSCDA in the tree). For example, in FIG. 53, SSCDA 5315 is the parent of SSCDA 5310 and the child of SSCDA 5320.

In the example shown in FIG. 53, the tree is a binary tree. It will be understood that other types of trees will fall within the scope of the appended claims. Further, while the tree in FIG. 53 is symmetrical, symmetry is not a limitation.

The SCDA 5110 gathers system resource information by broadcasting to all SSCDAs a request that they report their current resource consumption. In one example system, each SSCDA gathers the information related to its resource consumption, as well as that of its children SSCDAs, and reports the compiled resource consumption information to its parent SSCDA. In one example system, each SSCDA waits until it has received resource consumption information from its children before forwarding the compiled resource consumption information to its parent. In that way, the resource consumption information is compiled from the bottom of the tree to the top. When the root SSCDA 5305 compiles its resource consumption information with that which is reported to it by its children SSCDAs, it will have complete resource consumption information for the SSCDAs in the system. The root SSCDA 5305 will report that complete information to the SCDA. The SCDA will add to that information any resource consumption information that is available only at the system level and make its resource allocation adjustments based on those two sets of information.

In another example system, each of the SSCDAs communicates its resource consumption information directly to the SCDA 5110. The SCDA 5110 compiles the information it receives from the SSCDAs, adds system level resource consumption information, to the extent there is any, and makes its resource allocation adjustments based on the resulting set of information.

There are at least two ways by which the SCDA 5110 can implement its adjustments to the allocation of system resources. The first, illustrated in FIG. 51, is for the SCDA 5110 to communicate such adjustments to the request processor 625. The request processor 625 implements the adjustments to accomplish the resource allocation adjustments.

Alternatively, the SCDA 5110 can communicate its adjustments to the SSCDAs in the system, either directly or by passing them down the tree illustrated in FIG. 53. In either case, the SSCDAs incorporate the SCDA's resource allocation adjustments in the subsystem resource allocation adjustments that it sends to the request processor 625.

These techniques for communication between the SCDA 5110 and the SSCDAs can be accomplished by a single process running across all of the nodes and all of the AMPS, by multiple processes, where each process executes on a separate AMP, or by processes that can run on more than one, but not all, of the AMPs. "Process" should be interpreted to mean any or all of these configurations.

Since the SCDA 5110 has access to the resource consumption information from all SSCDAs, it can make resource allocation adjustments that are mindful of meeting the system workload rules. It can, for example, adjust the resources allocated to a particular workload group on a system-wide basis, to make sure that the workload rules for that workload group are met. It can identify bottlenecks in performance and allocate resources to alleviate the bottleneck. It can remove resources from a workload group that is idling system resources. In general, the SCDA 5110 provides a system view of meeting workload rules while the SSCDAs provide a subsystem view.

Source Identification

Conventional database systems typically capture information about the source of a request when the request is received. The information may identify the source application that sent the request to the DBMS and may also include other information about the request, such as when the request was transmitted to the DBMS. Examples of such information include: client source ID (external application name or ID), account name, account string, user name, date, time, request number, host ID, host type, etc. Much of this information is specific to the RDBMS and does not include information outside the domain of the database. Examples of such non-RDBMS-specific information includes external user ID, external click stream data, external web user, external application name, kind of application, and so on.

This information may be stored in the Query Log 505 and used by the Administrator 405, as described with respect to FIGS. 5 and 16, to create and manage workload definitions and workload groups. For example, the Administrator 405 may determine that the requests from a particular source are not being processed quickly enough and should be included in a workload group with service level goal set to a shorter response time. Part of that decision may be related to the identity of the source. That is, knowledge by the Administrator that a particular source requires short responses may effect the workload group assignment of requests from that source.

Figure 54:
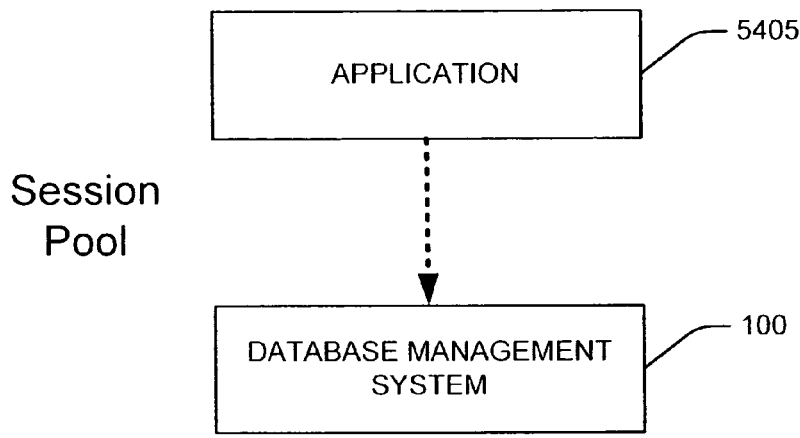
FIG. 54 illustrates a session pool.
Figure 55:
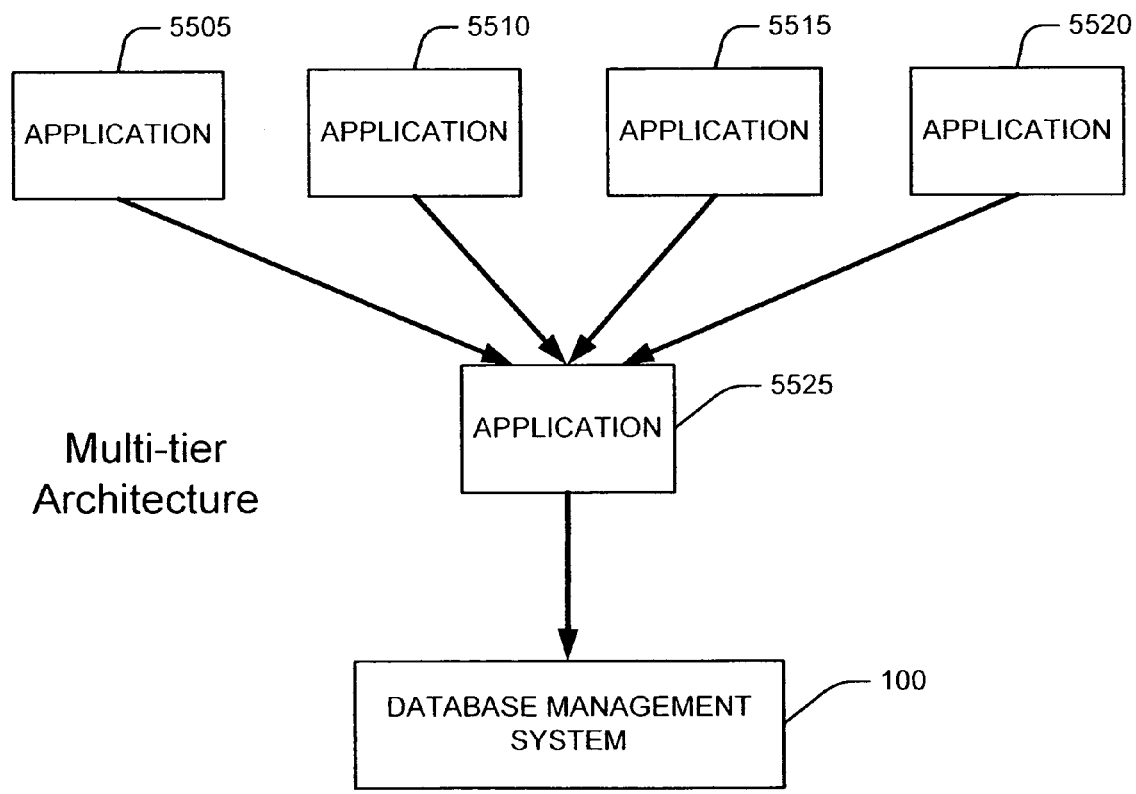
FIG. 55 illustrates a multi-tier architecture.

In some situations, such as those illustrated in FIGS. 54 and 55, the true source of the request may be hidden. In a session pool (or connection pool), shown in FIG. 54, the DBMS 100 maintains a number of sessions (or connections). An application 5405 seeking to submit a request to the DBMS is allocated one of the sessions and the request is transmitted to the DBMS in association with that session, but possibly without the information that describes the source. The session control block (block 200 in FIG. 2) may keep track of the session that originated the request but the session control block 200 might not have information as to the application 5405 that is the source of the request.

Similarly, in a multi-tier architecture, such as that shown in FIG. 55, numerous applications 5505, 5510, 5515, and 5520 submit requests to another application 5525 that in turn forwards the requests to the DBMS 100. Again, the identity of the true source of each request (one of applications 5505, 5510, 5515 and 5520) may not be included with the request and therefore may not be available for workload management purposes.

DBMS 100 provides an ability to receive, store (for example, log in the Query Log 505) and process information regarding the true source or sources of a request by allowing for receipt of a message that contains such information. Such a message may contain information indicating, not just the originating application of a request that follows or is included with the message, but also any intermediate applications that pass the request from the originating application to the DBMS 100. For example, referring to FIG. 55, a message originating with application 5505 may contain identification information for application 5505 and application 5525. The identification information for each application is added by that application as it is being passed toward the DBMS 100.

The identification information can take any form that is meaningful to the DBMS or that is meaningful to the originating application, to any intermediate application, to the accounting application for any of the originating or intermediate applications, or to any other application to which such identification information would be useful.

An example syntax for the message is shown below:
 SET SESSION gbid(client_login_id=Fred; applid=Accounting, external_user_id=foo, LDAP=/usr/ntos/bin/userx, click_stream_id=market_Basket, etc.)

The SET SESSION message from a source may establish identification information for the single request from that source that follows the SET SESSION message. Alternatively, it may establish identification information for all requests from that source until a new SET SESSION message is received. In addition, the SET SESSION message can be sent in the same parcel as the following request, which means the user is not required to wait for a synchronous (ACK) message. An example of this would be a multi-statement request prefaced by the SET SESSION message. In this case, all of the requests are interpreted as one request and the SET SESSION information applies to all of the statements in the request.

In the example shown, the "gbid" function causes the information in the parentheses to be stored in the Query Log 505, where it will be available for use in creating and maintaining workload definitions and workload groups. In the example shown, the information within the parentheses is made up of value-name pairs. Each value-name pair includes a source-identifying parameter (e.g., "client_login_id"), a connector (e.g., "="), and a value (e.g., "Fred") for that source-identifying parameter. In this example, the source-identifying parameters and the values associated with those parameters may be assigned by the application. Examples of other value-name pairs include: MSTRUSER (RequestSource User), REPORT (report name), REPORTGUID (report GUID), REPORTCOST (cost assigned to the RequestSource report), REPJOBSESSION (session GUID), REPJOBID (job ID assigned by the RequestSource Server), SQLPASSID (sequence number of the SQL pass within a report), MSTRPRIORITY (priority of the report within the RequestSource Server), DOCUMENT (document name), DOCJOBID (document job ID), FLAG1 (binary flag), LOGTMSTMP (timestamp at which application issues SQL request), LOGDATE (date at which application issues SQL request), CLIENTMACHINE (name or IP address of the client machine), WEBSRVRMACHINE (name or IP address of the web server machine responsible for the report request), MSTRSRVRMACHINE (name or IP address of the RequestSource Intelligence Server Machine), MSTRPROJECT (project name), PROJECTGUID (project GUID), APPLICATIONTYPE (name of the client application of the RequestSource Server), SERVERINSTNAME (name of the server instance submitting this request), REQUESTTYPE (type of RequestSource Request), REPORTTYPE (flag denoting type of the RequestSource report).

In the example shown above, after a SET SESSION message makes its way through a hierarchical structure, such as that shown in FIG. 55, it may contain value-name pairs identifying the originating application (e.g., application 5505) and any intermediate applications (e.g., application 5525) it traversed before reaching the DBMS 100.

In addition, the message may capture timestamp information as it is routed to a DBMS. For example, in passing through a system such as that shown in FIG. 55, the SET SESSION command may acquire value-name pairs associated with the date and time the message was processed (or transmitted, etc.) by the originating application and when it was processed (or received or transmitted, etc.) by an intermediate application. An example of the use of such timestamp information is in tracking heartbeat query times, step by step, to identify where in the hierarchical structure the query encounters delays. Further, this feature provides additional debugging and supportability capabilities because internal middle tier applications can insert SET SESSION information into a message, which allows the RDBMS to collect internal network and/or client information. The ability to gather this information can be beneficial to clients.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for identifying the source of a request to a database management system, the method including:
 a source application including source application identifying information along with the request when it is sent from the source application through a plurality of intermediate applications in sequence to the database management system;
 each of the plurality of intermediate applications including along with the request intermediate application identifying information regarding itself along with the source application identifying information and any intermediate application identifying information for intermediate applications that earlier received and passed on the request;
 the last intermediate application passing on the request, the source identifying information, and all intermediate application identifying information to the database management system;
 the database management system logging the source identifying information and all intermediate application identifying information and executing the request; and
 the database management system receiving a subsequent request from the last intermediate application without information identifying the source application.

2. A method for identifying the source of a request by a database management system, the method including the database management system:
 receiving a request from a last intermediate application, the last intermediate application being the last of a plurality of intermediate applications that passed on the request between the source application and the database management system, the request including:

source application identifying information providing information regarding a source application that originated the request; and a plurality of intermediate application identifying information, each intermediate identifying information providing information regarding one of the plurality of intermediate applications;

identifying the source application from the source application identifying information;

identifying the plurality of intermediate applications;

logging the source application and the plurality of intermediate applications;

executing the request; and receiving a subsequent request from the last intermediate application without information identifying the source application.

3. A method for identifying the source of a request by a database management system, the method including:

the database management system receiving a session-initiating message from a last intermediate application including the request and information identifying a source application that originated the request;

the database management system logging the identity of the last intermediate application and the source application with the request;

the database management system receiving a subsequent request from the last intermediate application without information identifying the source application;

the database management system logging the identity of the last intermediate application and the source application with the subsequent request; and the database management system executing the request.

* * * * *